(12) United States Patent
Alderucci et al.

(10) Patent No.: US 8,397,985 B2
(45) Date of Patent: *Mar. 19, 2013

(54) SYSTEMS AND METHODS FOR PROVIDING ACCESS TO WIRELESS GAMING DEVICES

(75) Inventors: Dean Alderucci, Westport, CT (US); Joseph M. Asher, New York, NY (US); Robert F. Bahrampour, New York, NY (US); Kevin Burman, Hunters Hills (AT); James J. Coffey, Norwalk, CT (US); Ronald Rushin, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/324,355

(22) Filed: Nov. 26, 2008

(65) Prior Publication Data

US 2009/0082098 A1   Mar. 26, 2009

Related U.S. Application Data

(63) Continuation of application No. 11/418,939, filed on May 5, 2006, now Pat. No. 7,549,576.

(51) Int. Cl.
*G06K 5/00* (2006.01)
(52) U.S. Cl. ........................................ 235/380; 235/381
(58) Field of Classification Search .................. 235/375, 235/380, 381, 382, 454, 492, 493
See application file for complete search history.

(56) References Cited

U.S. PATENT DOCUMENTS

| | | | |
|---|---|---|---|
| 3,580,581 A | 5/1971 | Raven | |
| 3,838,259 A | 9/1974 | Kortenhaus | |
| 3,876,208 A | 4/1975 | Wachtler et al. | |
| 3,929,338 A | 12/1975 | Busch | |
| 4,101,129 A | 7/1978 | Cox | |
| 4,157,829 A | 6/1979 | Goldman et al. | |
| 4,206,920 A | 6/1980 | Weatherford et al. | |
| 4,216,965 A | 8/1980 | Morrison et al. | |
| 4,238,127 A | 12/1980 | Lucero et al. | |
| 4,240,635 A | 12/1980 | Brown | |
| 4,266,214 A | 5/1981 | Peters, Jr. | |
| 4,335,809 A | 6/1982 | Wain | |
| 4,448,419 A | 5/1984 | Telnaes | |

(Continued)

FOREIGN PATENT DOCUMENTS

| DE | 31 29 550 A1 | 4/1982 |
|---|---|---|
| DE | 37 36 770 A1 | 5/1989 |

(Continued)

OTHER PUBLICATIONS

U.S. PTO Office Action for U.S. Appl. No. 11/199,964; 18 pages; Nov. 30, 2009.

(Continued)

*Primary Examiner* — Thien M Le
(74) *Attorney, Agent, or Firm* — Glen R. Farbanish

(57) ABSTRACT

Systems and methods for controlling access to wireless gaming devices and networks are provided. For example, access is controlled through one or more levels of security checks, such as a hard security check instead of or in addition to a soft security check. In a hard security check, the user employs an apparatus such as a card or other physical token that can be used to access the wireless gaming device. Such an apparatus may communicate information that identifies the user to the device or may simply be used to produce a signal without which the device is locked to users.

31 Claims, 5 Drawing Sheets

U.S. PATENT DOCUMENTS

| | | | |
|---|---|---|---|
| 4,467,424 A | 8/1984 | Hedges et al. | |
| 4,492,379 A | 1/1985 | Okada | |
| 4,527,798 A | 7/1985 | Siekierski et al. | |
| 4,572,509 A | 2/1986 | Stirick | |
| 4,573,681 A | 3/1986 | Okada | |
| 4,614,342 A | 9/1986 | Takashima | |
| 4,624,459 A | 11/1986 | Kaufman | |
| 4,636,951 A | 1/1987 | Harlick | |
| 4,648,600 A | 3/1987 | Oliiges | |
| 4,652,998 A | 3/1987 | Koza et al. | |
| 4,692,863 A | 9/1987 | Moosz | |
| 4,760,527 A | 7/1988 | Sidley | |
| 4,805,907 A | 2/1989 | Hagiwara | |
| 4,810,868 A | 3/1989 | Drexler | |
| 4,817,951 A | 4/1989 | Crouch et al. | |
| 4,838,552 A | 6/1989 | Hagiwara | |
| 4,853,884 A | 8/1989 | Brown et al. | |
| 4,856,787 A | 8/1989 | Itkis | |
| 4,858,932 A | 8/1989 | Keane | |
| 4,880,237 A | 11/1989 | Kishishita | |
| 4,909,516 A | 3/1990 | Kolinsky | |
| 4,926,327 A | 5/1990 | Sidley | |
| 4,959,783 A | 9/1990 | Scott et al. | |
| 4,964,638 A | 10/1990 | Ishida | |
| 5,007,087 A | 4/1991 | Bernstein et al. | |
| 5,024,441 A | 6/1991 | Rosseau | |
| 5,048,833 A | 9/1991 | Lamle | |
| 5,050,881 A | 9/1991 | Nagao | |
| 5,055,662 A | 10/1991 | Hasegawa | |
| 5,056,141 A | 10/1991 | Dyke | |
| 5,074,559 A | 12/1991 | Okada | |
| 5,083,785 A | 1/1992 | Okada | |
| 5,096,195 A | 3/1992 | Gimmon | |
| 5,096,202 A | 3/1992 | Hesland | |
| 5,102,134 A | 4/1992 | Smyth | |
| 5,192,076 A | 3/1993 | Komori | |
| 5,229,764 A | 7/1993 | Matchett et al. | |
| 5,242,163 A | 9/1993 | Fulton | |
| 5,251,165 A | 10/1993 | James, III | |
| 5,251,898 A | 10/1993 | Dickenson et al. | |
| 5,263,716 A | 11/1993 | Smyth | |
| 5,265,874 A | 11/1993 | Dickinson et al. | |
| 5,280,426 A | 1/1994 | Edmonds | |
| 5,280,909 A | 1/1994 | Tracy | |
| 5,298,476 A | 3/1994 | Hotta et al. | |
| 5,324,035 A | 6/1994 | Morris et al. | |
| 5,326,104 A | 7/1994 | Pease et al. | |
| 5,344,199 A | 9/1994 | Carstens et al. | |
| 5,351,970 A | 10/1994 | Fioretti | |
| 5,359,183 A | 10/1994 | Skodlar | |
| 5,370,306 A | 12/1994 | Schulze et al. | |
| 5,380,007 A | 1/1995 | Travis et al. | |
| 5,380,008 A | 1/1995 | Mathis et al. | |
| 5,393,061 A | 2/1995 | Manship et al. | |
| 5,398,932 A | 3/1995 | Eberhardt et al. | |
| 5,415,416 A | 5/1995 | Scagnelli et al. | |
| 5,421,576 A | 6/1995 | Yamazaki et al. | |
| 5,429,361 A | 7/1995 | Raven et al. | |
| 5,471,044 A | 11/1995 | Hotta et al. | |
| 5,476,259 A | 12/1995 | Weingardt | |
| 5,505,449 A | 4/1996 | Eberhardt et al. | |
| 5,507,485 A | 4/1996 | Fisher | |
| 5,511,784 A | 4/1996 | Furry et al. | |
| 5,524,888 A | 6/1996 | Heidel | |
| 5,534,685 A | 7/1996 | Takemoto et al. | |
| 5,551,692 A | 9/1996 | Pettit et al. | |
| 5,569,083 A | 10/1996 | Fioretti | |
| 5,569,084 A | 10/1996 | Nicastro et al. | |
| 5,580,309 A | 12/1996 | Piechowiak et al. | |
| 5,586,937 A | 12/1996 | Menashe | |
| 5,588,913 A | 12/1996 | Hecht | |
| 5,613,912 A | 3/1997 | Slater | |
| 5,618,232 A | 4/1997 | Martin | |
| 5,653,634 A | 8/1997 | Hodges | |
| 5,654,746 A | 8/1997 | McMulan, Jr. et al. | |
| 5,655,961 A | 8/1997 | Acres et al. | |
| 5,675,828 A | 10/1997 | Stoel et al. | |
| 5,697,844 A | 12/1997 | Von Kohorn | |
| 5,702,302 A | 12/1997 | Gauselman | |
| 5,707,286 A | 1/1998 | Carlson | |
| 5,738,583 A | 4/1998 | Comas et al. | |
| 5,745,102 A | 4/1998 | Bloch et al. | |
| 5,762,552 A | 6/1998 | Vuong et al. | |
| 5,764,789 A | 6/1998 | Pare, Jr. et al. | |
| 5,766,076 A | 6/1998 | Pease et al. | |
| 5,768,382 A | 6/1998 | Schneier et al. | |
| 5,785,595 A | 7/1998 | Gauselman | |
| 5,816,920 A | 10/1998 | Hanai | |
| 5,833,536 A | 11/1998 | Davids et al. | |
| 5,835,722 A | 11/1998 | Bradshaw et al. | |
| 5,836,817 A | 11/1998 | Acres et al. | |
| 5,851,148 A | 12/1998 | Brune et al. | |
| 5,857,911 A | 1/1999 | Fioretti | |
| 5,871,398 A | 2/1999 | Schneier et al. | |
| 5,878,211 A | 3/1999 | Delagrange | |
| 5,889,474 A | 3/1999 | LaDue | |
| 5,902,983 A | 5/1999 | Crevelt et al. | |
| 5,904,619 A | 5/1999 | Scagnelli et al. | |
| 5,904,620 A | 5/1999 | Kujawa | |
| 5,907,282 A | 5/1999 | Tuorto et al. | |
| 5,910,047 A | 6/1999 | Scagnelli et al. | |
| 5,920,640 A | 7/1999 | Salatino et al. | |
| 5,921,865 A | 7/1999 | Scagnelli | |
| 5,931,764 A | 8/1999 | Freeman et al. | |
| 5,935,005 A | 8/1999 | Tsuda et al. | |
| 5,951,397 A | 9/1999 | Dickinson | |
| 5,954,583 A | 9/1999 | Green | |
| 5,955,961 A | 9/1999 | Wallerstein | |
| 5,959,596 A | 9/1999 | McCarten et al. | |
| 5,970,143 A | 10/1999 | Schneier et al. | |
| 5,977,957 A | 11/1999 | Miller et al. | |
| 5,987,611 A | 11/1999 | Freund | |
| 5,991,431 A | 11/1999 | Borza et al. | |
| 5,995,630 A | 11/1999 | Borza et al. | |
| 5,999,808 A | 12/1999 | LaDue | |
| 6,001,016 A | 12/1999 | Walker et al. | |
| 6,003,013 A | 12/1999 | Boushy et al. | |
| 6,012,636 A | 1/2000 | Smith | |
| 6,012,982 A | 1/2000 | Piechowiak et al. | |
| 6,019,284 A | 2/2000 | Freeman et al. | |
| 6,022,274 A | 2/2000 | Takeda et al. | |
| 6,027,115 A | 2/2000 | Griswold et al. | |
| 6,048,269 A | 4/2000 | Burns et al. | |
| 6,050,622 A | 4/2000 | Gustafson | |
| 6,065,056 A | 5/2000 | Bradshaw et al. | |
| 6,080,061 A | 6/2000 | Watanabe et al. | |
| 6,098,985 A | 8/2000 | Moody | |
| 6,099,408 A | 8/2000 | Schneier et al. | |
| 6,100,804 A | 8/2000 | Brady et al. | |
| 6,104,815 A | 8/2000 | Alcorn | |
| 6,135,884 A | 10/2000 | Hedrick et al. | |
| 6,139,431 A | 10/2000 | Walker et al. | |
| 6,146,270 A | 11/2000 | Huard et al. | |
| 6,148,094 A | 11/2000 | Kinsella | |
| 6,177,905 B1 | 1/2001 | Welch | |
| 6,178,255 B1 | 1/2001 | Scott et al. | |
| 6,178,510 B1 | 1/2001 | O'Connoe et al. | |
| 6,183,366 B1 | 2/2001 | Goldberg et al. | |
| 6,193,153 B1 | 2/2001 | Lambert | |
| 6,196,920 B1 | 3/2001 | Spaur et al. | |
| 6,210,274 B1 | 4/2001 | Carlson | |
| 6,219,439 B1 | 4/2001 | Burger | |
| 6,233,448 B1 | 5/2001 | Alperovich et al. | |
| 6,248,017 B1 | 6/2001 | Roach | |
| 6,251,014 B1 | 6/2001 | Stockdale et al. | |
| 6,251,017 B1 | 6/2001 | Leason et al. | |
| 6,264,560 B1 | 7/2001 | Goldberg et al. | |
| 6,265,973 B1 | 7/2001 | Brammall et al. | |
| 6,272,223 B1 | 8/2001 | Carlson | |
| 6,277,026 B1 | 8/2001 | Archer | |
| 6,277,029 B1 | 8/2001 | Hanley | |
| 6,280,325 B1 | 8/2001 | Fisk | |
| 6,287,202 B1 | 9/2001 | Pascal et al. | |
| 6,290,601 B1 | 9/2001 | Yamazaki et al. | |
| RE37,414 E | 10/2001 | Harlick | |
| 6,309,307 B1 | 10/2001 | Krause et al. | |
| 6,320,495 B1 | 11/2001 | Sporgis | |

| Patent No. | Date | Inventor |
|---|---|---|
| 6,325,285 B1 | 12/2001 | Baratelli |
| 6,325,292 B1 | 12/2001 | Sehr |
| 6,331,148 B1 | 12/2001 | Krause et al. |
| 6,386,976 B1 | 5/2002 | Yamazaki et al. |
| 6,409,602 B1 | 6/2002 | Wiltshire et al. |
| 6,424,029 B1 | 7/2002 | Giesler |
| 6,425,828 B2 | 7/2002 | Walker et al. |
| 6,428,413 B1 | 8/2002 | Carlson |
| 6,441,752 B1 | 8/2002 | Fomukong |
| RE37,885 E | 10/2002 | Acres et al. |
| 6,468,155 B1 | 10/2002 | Zucker |
| 6,507,279 B2 | 1/2003 | Loof |
| 6,508,709 B1 | 1/2003 | Karmarkar |
| 6,508,710 B1 | 1/2003 | Paravia et al. |
| 6,509,217 B1 | 1/2003 | Reddy |
| 6,520,853 B2 | 2/2003 | Suzuki |
| 6,524,189 B1 | 2/2003 | Rautila |
| 6,527,641 B1 | 3/2003 | Sinclair et al. |
| 6,542,750 B2 | 4/2003 | Hendrey et al. |
| 6,554,707 B1 | 4/2003 | Sinclair |
| 6,556,819 B2 | 4/2003 | Irvin |
| 6,575,834 B1 | 6/2003 | Lindo |
| 6,577,733 B1 | 6/2003 | Charrin |
| 6,582,302 B2 | 6/2003 | Romero |
| 6,585,597 B2 | 7/2003 | Finn |
| 6,612,928 B1 | 9/2003 | Bradford et al. |
| 6,614,350 B1 | 9/2003 | Lunsford et al. |
| 6,618,706 B1 | 9/2003 | Rive et al. |
| 6,622,157 B1 | 9/2003 | Heddaya et al. |
| 6,628,939 B2 | 9/2003 | Paulsen |
| 6,631,849 B2 | 10/2003 | Blossom |
| 6,634,942 B2 | 10/2003 | Walker |
| 6,652,378 B2 | 11/2003 | Cannon et al. |
| 6,676,522 B2 | 1/2004 | Rowe et al. |
| 6,680,675 B1 | 1/2004 | Suzuki |
| 6,682,421 B1 | 1/2004 | Rowe et al. |
| 6,691,032 B1 | 2/2004 | Irish et al. |
| 6,709,333 B1 | 3/2004 | Bradford et al. |
| 6,719,631 B1 | 4/2004 | Tulley et al. |
| 6,721,542 B1 | 4/2004 | Anttila et al. |
| 6,729,956 B2 | 5/2004 | Wolf et al. |
| 6,743,098 B2 | 6/2004 | Urie et al. |
| 6,745,011 B1 | 6/2004 | Hendrickson |
| 6,749,505 B1 | 6/2004 | Kunzle |
| 6,754,210 B1 | 6/2004 | Ofek |
| 6,755,742 B1 | 6/2004 | Hartman |
| 6,756,882 B2 | 6/2004 | Benes |
| 6,761,638 B1 | 7/2004 | Narita |
| 6,773,350 B2 | 8/2004 | Yoshimi et al. |
| 6,778,820 B2 | 8/2004 | Tendler |
| 6,793,580 B2 | 9/2004 | Sinclair |
| 6,800,029 B2 | 10/2004 | Rowe et al. |
| 6,800,031 B2 | 10/2004 | Di Cesare |
| 6,801,934 B1 | 10/2004 | Eranko |
| 6,802,772 B1 | 10/2004 | Kunzle |
| 6,812,824 B1 | 11/2004 | Goldinger et al. |
| 6,834,195 B2 | 12/2004 | Brandenberg et al. |
| 6,837,789 B2 | 1/2005 | Garahi et al. |
| 6,843,412 B1 | 1/2005 | Sanford |
| 6,843,725 B2 | 1/2005 | Nelson |
| 6,846,238 B2 | 1/2005 | Wells et al. |
| 6,857,959 B1 | 2/2005 | Nguyen |
| 6,863,610 B2 | 3/2005 | Vancraeynest |
| 6,868,396 B2 | 3/2005 | Smith et al. |
| 6,884,162 B2 | 4/2005 | Raverdy |
| 6,884,166 B2 | 4/2005 | Leen et al. |
| 6,887,151 B2 | 5/2005 | Leen et al. |
| 6,887,159 B2 | 5/2005 | Leen et al. |
| 6,892,218 B2 | 5/2005 | Heddaya et al. |
| 6,892,938 B2 | 5/2005 | Solomon |
| 6,893,347 B1 | 5/2005 | Zilliacus |
| 6,896,618 B2 | 5/2005 | Benoy et al. |
| 6,898,299 B1 | 5/2005 | Brooks |
| 6,899,628 B2 | 5/2005 | Leen et al. |
| 6,904,520 B1 | 6/2005 | Rosset |
| 6,908,387 B2 | 6/2005 | Hedrick et al. |
| 6,908,391 B2 | 6/2005 | Gatto et al. |
| 6,923,724 B2 | 8/2005 | Williams |
| 6,935,952 B2 | 8/2005 | Walker et al. |
| 6,935,958 B2 | 8/2005 | Nelson |
| 6,942,574 B1 | 9/2005 | LeMay et al. |
| 6,945,870 B2 | 9/2005 | Gatto et al. |
| RE38,812 E | 10/2005 | Acres et al. |
| 6,966,832 B2 | 11/2005 | Leen et al. |
| 6,979,264 B2 | 12/2005 | Chatigny et al. |
| 6,979,267 B2 | 12/2005 | Leen et al. |
| 6,984,175 B2 | 1/2006 | Nguyen et al. |
| 6,986,055 B2 | 1/2006 | Carlson |
| 6,997,810 B2 | 2/2006 | Cole |
| 7,021,623 B2 | 4/2006 | Leen et al. |
| 7,022,017 B1 | 4/2006 | Halbritter et al. |
| 7,029,394 B2 | 4/2006 | Leen et al. |
| 7,033,276 B2 | 4/2006 | Walker et al. |
| 7,034,683 B2 | 4/2006 | Ghazarian |
| 7,035,653 B2 | 4/2006 | Simon et al. |
| 7,040,987 B2 | 5/2006 | Walker et al. |
| 7,042,360 B2 | 5/2006 | Light et al. |
| 7,042,391 B2 | 5/2006 | Meunier et al. |
| 7,043,641 B1 | 5/2006 | Martinek et al. |
| 7,047,197 B1 | 5/2006 | Bennett |
| 7,081,815 B2 | 7/2006 | Runyon et al. |
| 7,097,562 B2 | 8/2006 | Gagner |
| 7,102,507 B1 | 9/2006 | Lauren |
| 7,102,509 B1 | 9/2006 | Anders et al. |
| 7,124,947 B2 | 10/2006 | Storch |
| 7,125,334 B2 | 10/2006 | Yamazaki et al. |
| 7,128,482 B2 | 10/2006 | Meyerhofer et al. |
| 7,144,011 B2 | 12/2006 | Asher et al. |
| 7,147,558 B2 | 12/2006 | Giobbi |
| 7,158,798 B2 | 1/2007 | Lee et al. |
| 7,168,626 B2 | 1/2007 | Lerch et al. |
| 7,185,360 B1 | 2/2007 | Anton et al. |
| 7,194,273 B2 | 3/2007 | Vaudreuil |
| 7,207,885 B2 | 4/2007 | Longman |
| 7,228,651 B1 | 6/2007 | Saari |
| 7,229,354 B2 | 6/2007 | McNutt et al. |
| 7,229,385 B2 | 6/2007 | Freeman et al. |
| 7,233,922 B2 | 6/2007 | Asher et al. |
| 7,248,852 B2 | 7/2007 | Cabrera et al. |
| 7,270,605 B2 | 9/2007 | Russell et al. |
| 7,284,708 B2 | 10/2007 | Martin |
| 7,288,025 B1 | 10/2007 | Cumbers |
| 7,290,264 B1 | 10/2007 | Powers et al. |
| 7,297,062 B2 | 11/2007 | Gatto et al. |
| 7,306,514 B2 | 12/2007 | Amaitis et al. |
| 7,311,605 B2 | 12/2007 | Moser |
| 7,311,606 B2 | 12/2007 | Amaitis et al. |
| 7,316,619 B2 | 1/2008 | Nelson |
| 7,341,517 B2 | 3/2008 | Asher et al. |
| 7,357,717 B1 | 4/2008 | Cumbers |
| 7,394,405 B2 | 7/2008 | Godden |
| 7,413,513 B2 | 8/2008 | Nguyen et al. |
| 7,429,215 B2 | 9/2008 | Rozkin et al. |
| 7,437,147 B1 | 10/2008 | Luciano, Jr. |
| 7,442,124 B2 | 10/2008 | Asher et al. |
| 7,452,273 B2 | 11/2008 | Amaitis et al. |
| 7,452,274 B2 | 11/2008 | Amaitis et al. |
| 7,458,891 B2 | 12/2008 | Asher et al. |
| 7,460,863 B2 | 12/2008 | Steelberg et al. |
| 7,479,065 B1 | 1/2009 | McAllister et al. |
| 7,506,172 B2 | 3/2009 | Bhakta |
| 7,510,474 B2 | 3/2009 | Carter |
| 7,534,169 B2 | 5/2009 | Amaitis et al. |
| 7,546,946 B2 | 6/2009 | Hefner et al. |
| 7,549,576 B2 | 6/2009 | Alderucci et al. |
| 7,549,756 B2 | 6/2009 | Willis et al. |
| 7,562,034 B2 | 7/2009 | Asher et al. |
| 7,566,270 B2 | 7/2009 | Amaitis et al. |
| 7,637,810 B2 | 12/2009 | Amaitis et al. |
| 7,665,668 B2 | 2/2010 | Philips |
| 7,686,687 B2 | 3/2010 | Cannon et al. |
| 7,689,459 B2 | 3/2010 | Capurso et al. |
| 7,742,972 B2 * | 6/2010 | Lange et al. ............... 705/37 |
| 7,744,002 B2 | 6/2010 | Jones et al. |
| 7,867,083 B2 | 1/2011 | Wells et al. |
| 7,946,917 B2 | 5/2011 | Kaminkow et al. |
| 7,967,682 B2 * | 6/2011 | Huizinga ............... 463/42 |
| 8,016,667 B2 | 9/2011 | Benbrahim |

| | | |
|---|---|---|
| 8,047,914 B2 | 11/2011 | Morrow |
| 8,123,616 B2 | 2/2012 | Wells et al. |
| 8,142,283 B2 | 3/2012 | Lutnick |
| 2001/0018663 A1 | 8/2001 | Dusell et al. |
| 2001/0026610 A1 | 10/2001 | Katz et al. |
| 2001/0026632 A1 | 10/2001 | Tamai |
| 2001/0027130 A1 | 10/2001 | Namba et al. |
| 2001/0028308 A1 | 10/2001 | De La Huerga |
| 2001/0031663 A1 | 10/2001 | Johnson |
| 2001/0036858 A1 | 11/2001 | McNutt et al. |
| 2001/0049275 A1 | 12/2001 | Pierry et al. |
| 2002/0002075 A1 | 1/2002 | Rowe |
| 2002/0013827 A1 | 1/2002 | Edstrom et al. |
| 2002/0034978 A1 | 3/2002 | Legge et al. |
| 2002/0037767 A1 | 3/2002 | Ebin |
| 2002/0049909 A1 | 4/2002 | Jackson et al. |
| 2002/0052231 A1 | 5/2002 | Fioretti |
| 2002/0065097 A1 | 5/2002 | Brockenbrough |
| 2002/0068631 A1 | 6/2002 | Raverdy |
| 2002/0073021 A1 | 6/2002 | Ginsberg et al. |
| 2002/0074725 A1 | 6/2002 | Stern |
| 2002/0087505 A1 | 7/2002 | Smith et al. |
| 2002/0095586 A1 | 7/2002 | Doyle et al. |
| 2002/0111210 A1 | 8/2002 | Luciano |
| 2002/0111213 A1 | 8/2002 | McEntee et al. |
| 2002/0119817 A1 | 8/2002 | Behm |
| 2002/0124182 A1 | 9/2002 | Bacso |
| 2002/0125886 A1 | 9/2002 | Bates et al. |
| 2002/0128057 A1 | 9/2002 | Walker et al. |
| 2002/0132663 A1 | 9/2002 | Cumbers |
| 2002/0142844 A1 | 10/2002 | Kerr |
| 2002/0142846 A1 | 10/2002 | Paulsen |
| 2002/0143960 A1 | 10/2002 | Goren |
| 2002/0143991 A1 | 10/2002 | Chow et al. |
| 2002/0147047 A1 | 10/2002 | Letovsky |
| 2002/0147049 A1 | 10/2002 | Carter, Sr. |
| 2002/0151344 A1 | 10/2002 | Tanskanen |
| 2002/0155884 A1 | 10/2002 | Updike |
| 2002/0157090 A1 | 10/2002 | Anton, Jr. |
| 2002/0160834 A1 | 10/2002 | Urie et al. |
| 2002/0160838 A1 | 10/2002 | Kim |
| 2002/0165020 A1 | 11/2002 | Koyama |
| 2002/0174336 A1 | 11/2002 | Sakakibara et al. |
| 2002/0183105 A1 | 12/2002 | Cannon et al. |
| 2002/0184653 A1 | 12/2002 | Pierce et al. |
| 2002/0191017 A1 | 12/2002 | Sinclair |
| 2002/0198044 A1 | 12/2002 | Walker |
| 2003/0003988 A1 | 1/2003 | Walker et al. |
| 2003/0003997 A1 | 1/2003 | Vuong et al. |
| 2003/0006931 A1 | 1/2003 | Mages |
| 2003/0008662 A1 | 1/2003 | Stern et al. |
| 2003/0009603 A1 | 1/2003 | Ruths et al. |
| 2003/0013438 A1 | 1/2003 | Darby |
| 2003/0013513 A1 | 1/2003 | Rowe |
| 2003/0014639 A1 | 1/2003 | Jackson et al. |
| 2003/0017871 A1 | 1/2003 | Urie et al. |
| 2003/0027631 A1 | 2/2003 | Hedrick et al. |
| 2003/0028567 A1 | 2/2003 | Carlson |
| 2003/0031321 A1* | 2/2003 | Mages ............ 380/270 |
| 2003/0032407 A1 | 2/2003 | Mages |
| 2003/0032434 A1 | 2/2003 | Willner et al. |
| 2003/0036425 A1 | 2/2003 | Kaminkow et al. |
| 2003/0036428 A1 | 2/2003 | Aasland |
| 2003/0040324 A1 | 2/2003 | Eldering et al. |
| 2003/0045353 A1 | 3/2003 | Paulsen et al. |
| 2003/0045358 A1 | 3/2003 | Leen et al. |
| 2003/0054878 A1 | 3/2003 | Benoy et al. |
| 2003/0060286 A1 | 3/2003 | Walker |
| 2003/0064712 A1 | 4/2003 | Gaston |
| 2003/0064798 A1 | 4/2003 | Grauzer et al. |
| 2003/0064805 A1 | 4/2003 | Wells |
| 2003/0064807 A1 | 4/2003 | Walker et al. |
| 2003/0069071 A1 | 4/2003 | Britt et al. |
| 2003/0069940 A1 | 4/2003 | Kavacheri et al. |
| 2003/0078101 A1 | 4/2003 | Schneider et al. |
| 2003/0087652 A1 | 5/2003 | Simon et al. |
| 2003/0087701 A1 | 5/2003 | Paravia et al. |
| 2003/0104865 A1 | 6/2003 | Itkis et al. |
| 2003/0109306 A1 | 6/2003 | Karmarkar |
| 2003/0109310 A1 | 6/2003 | Heaton et al. |
| 2003/0114218 A1 | 6/2003 | McClintic |
| 2003/0130032 A1 | 7/2003 | Martinek et al. |
| 2003/0139190 A1 | 7/2003 | Steelberg |
| 2003/0140131 A1 | 7/2003 | Chandrashekhar |
| 2003/0148809 A1 | 8/2003 | Nelson |
| 2003/0148812 A1 | 8/2003 | Paulsen et al. |
| 2003/0157976 A1 | 8/2003 | Simon |
| 2003/0162580 A1 | 8/2003 | Cousineau |
| 2003/0162593 A1 | 8/2003 | Grisworld et al. |
| 2003/0162594 A1 | 8/2003 | Rowe |
| 2003/0173408 A1 | 9/2003 | Mosher et al. |
| 2003/0176162 A1 | 9/2003 | Planki |
| 2003/0176218 A1 | 9/2003 | Lemay |
| 2003/0177187 A1 | 9/2003 | Levine et al. |
| 2003/0177347 A1 | 9/2003 | Schneier et al. |
| 2003/0190944 A1 | 10/2003 | Manfredi et al. |
| 2003/0195037 A1 | 10/2003 | Vuong et al. |
| 2003/0195043 A1 | 10/2003 | Shinners et al. |
| 2003/0195841 A1 | 10/2003 | Ginsberg et al. |
| 2003/0224855 A1 | 12/2003 | Cunningham |
| 2003/0228895 A1 | 12/2003 | Edelson |
| 2003/0228898 A1 | 12/2003 | Rowe |
| 2003/0228907 A1 | 12/2003 | Gatto et al. |
| 2003/0228910 A1 | 12/2003 | Jawaharla et al. |
| 2003/0236120 A1 | 12/2003 | Reece |
| 2004/0002355 A1 | 1/2004 | Spencer |
| 2004/0002383 A1 | 1/2004 | Lundy |
| 2004/0002386 A1 | 1/2004 | Wolfe et al. |
| 2004/0002843 A1 | 1/2004 | Robarts |
| 2004/0009812 A1 | 1/2004 | Scott et al. |
| 2004/0014522 A1 | 1/2004 | Walker et al. |
| 2004/0029635 A1 | 2/2004 | Giobbi |
| 2004/0034775 A1 | 2/2004 | Desjardins et al. |
| 2004/0038734 A1 | 2/2004 | Adams |
| 2004/0048613 A1 | 3/2004 | Sayers |
| 2004/0053692 A1 | 3/2004 | Chatingny et al. |
| 2004/0061646 A1 | 4/2004 | Andrews et al. |
| 2004/0063497 A1 | 4/2004 | Gould |
| 2004/0066296 A1 | 4/2004 | Atherton |
| 2004/0068441 A1 | 4/2004 | Werbitt |
| 2004/0068532 A1 | 4/2004 | Dewing |
| 2004/0083394 A1 | 4/2004 | Brebner et al. |
| 2004/0092306 A1 | 5/2004 | George et al. |
| 2004/0092311 A1 | 5/2004 | Weston |
| 2004/0097283 A1 | 5/2004 | Piper |
| 2004/0097287 A1 | 5/2004 | Postrel |
| 2004/0104274 A1 | 6/2004 | Kotik et al. |
| 2004/0104845 A1 | 6/2004 | McCarthy |
| 2004/0111369 A1 | 6/2004 | Lane et al. |
| 2004/0118930 A1 | 6/2004 | Berardi et al. |
| 2004/0127277 A1 | 7/2004 | Walker et al. |
| 2004/0127289 A1 | 7/2004 | Davis |
| 2004/0132530 A1 | 7/2004 | Rutanen |
| 2004/0137983 A1 | 7/2004 | Kerr et al. |
| 2004/0137987 A1 | 7/2004 | Nguyen et al. |
| 2004/0142744 A1 | 7/2004 | Atkinson et al. |
| 2004/0147323 A1 | 7/2004 | Cliff et al. |
| 2004/0162124 A1 | 8/2004 | Barton |
| 2004/0162144 A1 | 8/2004 | Loose |
| 2004/0186768 A1 | 9/2004 | Wakim et al. |
| 2004/0189470 A1 | 9/2004 | Girvin et al. |
| 2004/0192438 A1 | 9/2004 | Wells et al. |
| 2004/0192442 A1 | 9/2004 | Wells et al. |
| 2004/0193469 A1 | 9/2004 | Amaitis et al. |
| 2004/0193531 A1 | 9/2004 | Amaitis et al. |
| 2004/0198386 A1 | 10/2004 | Dupray |
| 2004/0198396 A1 | 10/2004 | Fransioli |
| 2004/0198403 A1 | 10/2004 | Pedersen et al. |
| 2004/0198483 A1 | 10/2004 | Amaitis et al. |
| 2004/0209660 A1 | 10/2004 | Carlson |
| 2004/0209690 A1 | 10/2004 | Bruzzese |
| 2004/0219961 A1 | 11/2004 | Ellenby |
| 2004/0224769 A1 | 11/2004 | Hansen |
| 2004/0225565 A1 | 11/2004 | Selman |
| 2004/0229685 A1 | 11/2004 | Smith |
| 2004/0229699 A1 | 11/2004 | Gentles et al. |
| 2003/0242332 | 12/2004 | Walker et al. |
| 2004/0242297 A1 | 12/2004 | Walker |

| | | |
|---|---|---|
| 2004/0242332 A1 | 12/2004 | Walker et al. |
| 2004/0243504 A1 | 12/2004 | Asher et al. |
| 2004/0248637 A1 | 12/2004 | Liebenberg et al. |
| 2004/0248653 A1 | 12/2004 | Barros et al. |
| 2004/0259626 A1 | 12/2004 | Akram |
| 2004/0259631 A1 | 12/2004 | Katz et al. |
| 2004/0266533 A1 | 12/2004 | Gentles et al. |
| 2005/0001711 A1 | 1/2005 | Doughty et al. |
| 2005/0003888 A1 | 1/2005 | Asher et al. |
| 2005/0003893 A1 | 1/2005 | Hogwood et al. |
| 2005/0009600 A1 | 1/2005 | Rowe et al. |
| 2005/0014554 A1 | 1/2005 | Walker et al. |
| 2005/0020336 A1 | 1/2005 | Cesare |
| 2005/0020340 A1 | 1/2005 | Cannon |
| 2005/0026670 A1 | 2/2005 | Lardie |
| 2005/0026697 A1 | 2/2005 | Balahura |
| 2005/0027643 A1 | 2/2005 | Amaitis et al. |
| 2005/0043996 A1 | 2/2005 | Silver |
| 2005/0049949 A1 | 3/2005 | Asher et al. |
| 2005/0054439 A1 | 3/2005 | Rowe et al. |
| 2005/0059397 A1 | 3/2005 | Zhao |
| 2005/0059485 A1 | 3/2005 | Paulsen |
| 2005/0064934 A1 | 3/2005 | Amaitis et al. |
| 2005/0086301 A1 | 4/2005 | Eichler et al. |
| 2005/0096109 A1 | 5/2005 | McNutt et al. |
| 2005/0096133 A1 | 5/2005 | Hoefelmeyer et al. |
| 2005/0101383 A1 | 5/2005 | Wells |
| 2005/0107022 A1 | 5/2005 | Wichelmann |
| 2005/0116020 A1 | 6/2005 | Smolucha et al. |
| 2005/0130728 A1 | 6/2005 | Ngyuen et al. |
| 2005/0131815 A1 | 6/2005 | Fung et al. |
| 2005/0137014 A1 | 6/2005 | Vetelainen |
| 2005/0143169 A1 | 6/2005 | Ngyuen et al. |
| 2005/0159212 A1 | 7/2005 | Romney et al. |
| 2005/0170886 A1 | 8/2005 | Miller |
| 2005/0170890 A1 | 8/2005 | Rowe et al. |
| 2005/0170892 A1 | 8/2005 | Atkinson |
| 2005/0181859 A1 | 8/2005 | Lind et al. |
| 2005/0181862 A1 | 8/2005 | Asher et al. |
| 2005/0181870 A1 | 8/2005 | Nguyen et al. |
| 2005/0187000 A1 | 8/2005 | Nguyen |
| 2005/0187020 A1 | 8/2005 | Amaitis et al. |
| 2005/0192077 A1 | 9/2005 | Okuniewicz |
| 2005/0193118 A1 | 9/2005 | Le et al. |
| 2005/0193209 A1 | 9/2005 | Saunders et al. |
| 2005/0197189 A1 | 9/2005 | Schultz |
| 2005/0197190 A1 | 9/2005 | Amaitis et al. |
| 2005/0209002 A1 | 9/2005 | Blythe et al. |
| 2005/0215306 A1 | 9/2005 | O'Donnell et al. |
| 2005/0234774 A1 | 10/2005 | Dupree |
| 2005/0239523 A1 | 10/2005 | Longman et al. |
| 2005/0239524 A1 | 10/2005 | Longman et al. |
| 2005/0239546 A1 | 10/2005 | Hedrick et al. |
| 2005/0245306 A1 | 11/2005 | Asher et al. |
| 2005/0245308 A1 | 11/2005 | Amaitis et al. |
| 2005/0261061 A1 | 11/2005 | Nguyen et al. |
| 2005/0277471 A1 | 12/2005 | Russell et al. |
| 2005/0277472 A1 | 12/2005 | Gillan et al. |
| 2005/0282638 A1 | 12/2005 | Rowe et al. |
| 2005/0288937 A1 | 12/2005 | Verdiramo |
| 2006/0005050 A1 | 1/2006 | Basson et al. |
| 2006/0009279 A1 | 1/2006 | Amaitis et al. |
| 2006/0016877 A1 | 1/2006 | Bonalle et al. |
| 2006/0019745 A1 | 1/2006 | Benbrahim |
| 2006/0035707 A1 | 2/2006 | Nguyen et al. |
| 2006/0040741 A1 | 2/2006 | Grisworld et al. |
| 2006/0052153 A1 | 3/2006 | Vlazny et al. |
| 2006/0058102 A1 | 3/2006 | Nguyen et al. |
| 2006/0068917 A1 | 3/2006 | Snoddy et al. |
| 2006/0069711 A1 | 3/2006 | Tsunekawa et al. |
| 2006/0076404 A1 | 4/2006 | Frerking |
| 2006/0093142 A1 | 5/2006 | Schneier et al. |
| 2006/0095790 A1 | 5/2006 | Nguyen et al. |
| 2006/0116198 A1 | 6/2006 | Leen et al. |
| 2006/0116199 A1 | 6/2006 | Leen et al. |
| 2006/0116200 A1 | 6/2006 | Leen et al. |
| 2006/0121970 A1 | 6/2006 | Khal |
| 2006/0121987 A1 | 6/2006 | Bortnik et al. |
| 2006/0121992 A1 | 6/2006 | Bortnik et al. |
| 2006/0131391 A1 | 6/2006 | Penuela |
| 2006/0135252 A1 | 6/2006 | Amaitis et al. |
| 2006/0135259 A1 | 6/2006 | Nancke-Krogh et al. |
| 2006/0148560 A1 | 7/2006 | Arezina et al. |
| 2006/0148561 A1 | 7/2006 | Moser |
| 2006/0160626 A1 | 7/2006 | Gatto et al. |
| 2006/0163346 A1 | 7/2006 | Lee et al. |
| 2006/0165235 A1 | 7/2006 | Carlson |
| 2006/0166740 A1 | 7/2006 | Sufuentes |
| 2006/0178216 A1 | 8/2006 | Shea et al. |
| 2006/0183522 A1 | 8/2006 | Leen et al. |
| 2006/0187029 A1 | 8/2006 | Thomas |
| 2006/0189382 A1 | 8/2006 | Muir et al. |
| 2006/0194589 A1 | 8/2006 | Saniska |
| 2006/0205489 A1 | 9/2006 | Carpenter et al. |
| 2006/0205497 A1 | 9/2006 | Wells et al. |
| 2006/0209810 A1 | 9/2006 | Krzyanowski et al. |
| 2006/0224046 A1 | 10/2006 | Ramadas et al. |
| 2006/0234631 A1 | 10/2006 | Dieguez |
| 2006/0234791 A1 | 10/2006 | Nguyen et al. |
| 2006/0246990 A1 | 11/2006 | Downes |
| 2006/0247026 A1 | 11/2006 | Walker et al. |
| 2006/0247039 A1 | 11/2006 | Lerner et al. |
| 2006/0247041 A1 | 11/2006 | Walker et al. |
| 2006/0252501 A1 | 11/2006 | Little et al. |
| 2006/0252530 A1 | 11/2006 | Oberberger et al. |
| 2006/0258429 A1 | 11/2006 | Manning et al. |
| 2006/0277308 A1 | 12/2006 | Morse et al. |
| 2006/0277413 A1 | 12/2006 | Drews |
| 2006/0287092 A1 | 12/2006 | Walker et al. |
| 2006/0287098 A1 | 12/2006 | Morrow et al. |
| 2007/0001841 A1 | 1/2007 | Anders et al. |
| 2007/0003034 A1 | 1/2007 | Schultz et al. |
| 2007/0015564 A1 | 1/2007 | Walker et al. |
| 2007/0021213 A1 | 1/2007 | Foe et al. |
| 2007/0026939 A1 | 2/2007 | Asher et al. |
| 2007/0032301 A1 | 2/2007 | Acres et al. |
| 2007/0054739 A1 | 3/2007 | Amaitis et al. |
| 2007/0060306 A1 | 3/2007 | Amaitis et al. |
| 2007/0060312 A1 | 3/2007 | Dempsey et al. |
| 2007/0060326 A1 | 3/2007 | Juds et al. |
| 2007/0060355 A1 | 3/2007 | Amaitis et al. |
| 2007/0060358 A1 | 3/2007 | Amaitis et al. |
| 2007/0066401 A1 | 3/2007 | Amaitis |
| 2007/0066402 A1 | 3/2007 | Amaitis |
| 2007/0087834 A1 | 4/2007 | Moser et al. |
| 2007/0087843 A1 | 4/2007 | Steil et al. |
| 2007/0093296 A1 | 4/2007 | Asher et al. |
| 2007/0099697 A1 | 5/2007 | Nelson |
| 2007/0099703 A1 | 5/2007 | Terebilo |
| 2007/0117604 A1 | 5/2007 | Hill |
| 2007/0117634 A1 | 5/2007 | Hamilton et al. |
| 2007/0136817 A1 | 6/2007 | Ngyuen |
| 2007/0167237 A1 | 7/2007 | Wang et al. |
| 2007/0181676 A1 | 8/2007 | Mateen et al. |
| 2007/0190494 A1 | 8/2007 | Rosenberg |
| 2007/0213120 A1 | 9/2007 | Beal et al. |
| 2007/0233585 A1 | 10/2007 | Simon et al. |
| 2007/0235807 A1 | 10/2007 | Sobel et al. |
| 2007/0238443 A1 | 10/2007 | Richardson |
| 2007/0241187 A1 | 10/2007 | Alderucci et al. |
| 2007/0243927 A1* | 10/2007 | Soltys .............................. 463/25 |
| 2007/0243935 A1* | 10/2007 | Huizinga ........................ 463/42 |
| 2007/0257101 A1 | 11/2007 | Alderucci et al. |
| 2007/0258507 A1 | 11/2007 | Lee et al. |
| 2007/0275779 A1 | 11/2007 | Amaitis |
| 2007/0281782 A1 | 12/2007 | Amaitis |
| 2007/0281785 A1 | 12/2007 | Amaitis |
| 2007/0281792 A1 | 12/2007 | Amaitis |
| 2007/0282959 A1 | 12/2007 | Stern |
| 2008/0004121 A1 | 1/2008 | Gatto et al. |
| 2008/0009344 A1 | 1/2008 | Graham et al. |
| 2008/0015013 A1 | 1/2008 | Gelman et al. |
| 2008/0022089 A1 | 1/2008 | Leedom |
| 2008/0026829 A1 | 1/2008 | Martin et al. |
| 2008/0026844 A1 | 1/2008 | Wells et al. |
| 2008/0032801 A1 | 2/2008 | Brunet de Courssou |
| 2008/0039196 A1 | 2/2008 | Walther et al. |
| 2008/0051193 A1 | 2/2008 | Kaminkow et al. |

| | | | | | | |
|---|---|---|---|---|---|---|
| 2008/0066111 A1 | 3/2008 | Ellis et al. | JP | 200387614 | 12/2000 | |
| 2008/0076505 A1 | 3/2008 | Nguyen et al. | JP | 2001-70658 | 3/2001 | |
| 2008/0076506 A1 | 3/2008 | Nguyen et al. | JP | 2001-204972 | 7/2001 | |
| 2008/0076572 A1 | 3/2008 | Nguyen et al. | JP | 2001/212363 | 8/2001 | |
| 2008/0096659 A1 | 4/2008 | Kreloff et al. | JP | 2001 236458 | 8/2001 | |
| 2008/0108423 A1 | 5/2008 | Benbrahim et al. | JP | 2001-340656 | 12/2001 | |
| 2008/0113785 A1 | 5/2008 | Alderucci et al. | JP | 2001-526550 | 12/2001 | |
| 2008/0113786 A1 | 5/2008 | Alderucci et al. | JP | 2002 032515 | 1/2002 | |
| 2008/0113787 A1 | 5/2008 | Alderucci et al. | JP | 2002-049681 | 2/2002 | |
| 2008/0113816 A1 | 5/2008 | Mahaffey et al. | JP | 2002-056270 | 2/2002 | |
| 2008/0139306 A1 | 6/2008 | Lutnick et al. | JP | 2002107224 | 2/2002 | |
| 2008/0146323 A1 | 6/2008 | Hardy et al. | JP | 2002-661444 | 3/2002 | |
| 2008/0150678 A1 | 6/2008 | Giobbi et al. | JP | 2002 133009 | 5/2002 | |
| 2008/0182644 A1 | 7/2008 | Lutnick et al. | JP | 2002 189831 | 7/2002 | |
| 2008/0195664 A1 | 8/2008 | Maharajh et al. | JP | 2002-292113 | 10/2002 | |
| 2008/0207302 A1 | 8/2008 | Lind et al. | JP | 2003 078591 | 3/2003 | |
| 2008/0214261 A1 | 9/2008 | Alderucci et al. | JP | 2003166050 | 6/2003 | |
| 2008/0218312 A1 | 9/2008 | Asher et al. | JP | 2003 228642 | 8/2003 | |
| 2008/0220871 A1 | 9/2008 | Asher et al. | JP | 2002024979 | 8/2003 | |
| 2008/0254897 A1 | 10/2008 | Saunders et al. | JP | 2002 149894 | 5/2004 | |
| 2008/0305856 A1 | 12/2008 | Walker et al. | JP | 2004-261202 | 9/2004 | |
| 2008/0305867 A1 | 12/2008 | Guthrie | JP | 2004-321558 | 11/2004 | |
| 2008/0311994 A1 | 12/2008 | Amaitis et al. | JP | 2004-536638 | 12/2004 | |
| 2008/0318670 A1 | 12/2008 | Zinder et al. | JP | 2005 005936 | 1/2005 | |
| 2009/0049542 A1 | 2/2009 | DeYonker et al. | RU | 2190477 | 10/2002 | |
| 2009/0055204 A1 | 2/2009 | Pennington et al. | WO | WO 80/02512 A1 | 11/1980 | |
| 2009/0088232 A1 | 4/2009 | Amaitis et al. | WO | WO93/10508 | 5/1993 | |
| 2009/0098925 A1 | 4/2009 | Gagner et al. | WO | WO 94/10658 | 5/1994 | |
| 2009/0117989 A1 | 5/2009 | Arezina et al. | WO | WO 94/16416 | 7/1994 | |
| 2009/0149233 A1 | 6/2009 | Strause et al. | WO | WO 95/24689 A1 | 9/1995 | |
| 2009/0163272 A1 | 6/2009 | Baker et al. | WO | WO 95/30944 | 11/1995 | |
| 2009/0178118 A1 | 7/2009 | Cedo et al. | WO | WO 96/00950 A1 | 1/1996 | |
| 2009/0183208 A1 | 7/2009 | Christensen et al. | WO | WO 96/15837 A1 | 5/1996 | |
| 2009/0204905 A1 | 8/2009 | Toghia | WO | WO97/44750 | 11/1997 | |
| 2009/0209233 A1 | 8/2009 | Morrison | WO | WO 98/09694 A1 | 3/1998 | |
| 2009/0325708 A9 | 12/2009 | Kerr | WO | WO 99/04873 A1 | 2/1999 | |
| 2010/0062834 A1 | 3/2010 | Ryan | WO | WO 99/08762 A1 | 2/1999 | |
| 2010/0069158 A1 | 3/2010 | Kim | WO | WO 99/19027 | 4/1999 | |
| 2010/0113143 A1 | 5/2010 | Gagner et al. | WO | WO 99/42964 | 8/1999 | |
| 2010/0153511 A1 | 6/2010 | Lin | WO | WO99/42964 | 8/1999 | |
| 2010/0205255 A1 | 8/2010 | Alderucci | WO | WO 99/52077 | 10/1999 | |
| 2010/0211431 A1 | 8/2010 | Lutnick | WO | WO 00/77753 A1 | 12/2000 | |
| 2010/0240455 A1 | 9/2010 | Gagner et al. | WO | WO 01/17262 A1 | 3/2001 | |
| | | | WO | WO 02/37246 | 5/2001 | |

FOREIGN PATENT DOCUMENTS

| | | | | | |
|---|---|---|---|---|---|
| DE | 43 16 652 A1 | 11/1994 | WO | WO 01/40978 A2 | 6/2001 |
| DE | 19922862 | 12/2000 | WO | WO 01/48712 A1 | 7/2001 |
| DE | 19944140 | 3/2001 | WO | WO 01/48713 | 7/2001 |
| DE | 19952691 | 5/2001 | WO | WO 01/48713 A1 | 7/2001 |
| DE | 19952692 | 5/2001 | WO | WO 01/54091 | 7/2001 |
| DE | 10060079 | 6/2002 | WO | 01/67218 | 9/2001 |
| EP | 0 840 639 B1 | 7/1996 | WO | WO 01/82176 | 11/2001 |
| EP | 0 506 873 B1 | 3/2000 | WO | WO 01/84817 A1 | 11/2001 |
| EP | 1045346 | 10/2000 | WO | WO 01/89233 A3 | 11/2001 |
| EP | 1063622 | 12/2000 | WO | WO 02/10931 A1 | 2/2002 |
| EP | 1 066 868 A2 | 1/2001 | WO | WO 02/21457 A1 | 3/2002 |
| EP | 1120757 | 1/2001 | WO | WO 02/31739 | 4/2002 |
| EP | 1 202 528 A3 | 5/2002 | WO | WO 02/39605 A1 | 5/2002 |
| EP | 1231577 | 8/2002 | WO | WO 02/41199 A3 | 5/2002 |
| EP | 1291830 A2 | 3/2003 | WO | WO 02/47042 | 6/2002 |
| EP | 1 475 755 A1 | 12/2003 | WO | WO 02/065750 A2 | 8/2002 |
| EP | 1 475 756 A2 | 11/2004 | WO | WO 02/071351 A2 | 9/2002 |
| EP | 1480102 A2 | 11/2004 | WO | WO 02/077931 A1 | 10/2002 |
| EP | 1 531 646 A1 | 5/2005 | WO | WO02/101486 | 12/2002 |
| EP | 1259930 B1 | 6/2005 | WO | WO 02/101486 A3 | 12/2002 |
| EP | 1480102 A3 | 10/2008 | WO | WO 03/005743 | 1/2003 |
| GB | 2 248 404 | 4/1992 | WO | 03/015299 A1 | 2/2003 |
| GB | 2 256 594 | 12/1992 | WO | WO 03/013678 A1 | 2/2003 |
| GB | 2 391 432 | 2/2004 | WO | WO 03/021543 | 3/2003 |
| GB | 2 391 767 | 2/2004 | WO | WO 03/027970 A2 | 4/2003 |
| GB | 2394675 | 5/2004 | WO | 03/045519 | 6/2003 |
| GB | 2 406 291 | 3/2005 | WO | 03/081447 | 10/2003 |
| JP | H11-220766 | 1/1988 | WO | WO 2004/000428 A1 | 12/2003 |
| JP | 5-317485 | 12/1993 | WO | WO 2004/003810 A1 | 1/2004 |
| JP | 2000-69540 | 8/1998 | WO | WO 2004/013820 | 2/2004 |
| JP | 2000049046 | 2/2000 | WO | WO 2004/014506 A1 | 2/2004 |
| JP | 200218125 | 7/2000 | WO | WO 2004/023253 A3 | 3/2004 |
| JP | 200326491 | 10/2000 | WO | 2004/027689 A2 | 4/2004 |
| JP | 200345435 | 11/2000 | WO | WO 2005/022453 | 8/2004 |
| | | | WO | WO 2004/073812 A2 | 9/2004 |

| | | |
|---|---|---|
| WO | WO 2004/095383 | 11/2004 |
| WO | WO 2004/104763 A2 | 12/2004 |
| WO | WO 2004/114235 A1 | 12/2004 |
| WO | WO 2005/001651 | 1/2005 |
| WO | WO 2005/015458 A1 | 2/2005 |
| WO | WO 2005/026870 A2 | 3/2005 |
| WO | WO 2005/031627 A1 | 4/2005 |
| WO | WO 2005/031666 A1 | 4/2005 |
| WO | WO 2005/036425 A1 | 4/2005 |
| WO | WO 2005/050574 A2 | 6/2005 |
| WO | WO2005098650 | 10/2005 |
| WO | 2006/023230 | 3/2006 |
| WO | WO 2007/008601 A2 | 1/2007 |
| WO | WO97/19537 | 5/2007 |
| WO | WO 97/19537 | 5/2007 |
| WO | WO 2008/005264 | 1/2008 |
| WO | WO 2008/016610 | 2/2008 |

OTHER PUBLICATIONS

U.S. PTO Office Action for U.S. Appl. No. 11/683,476; 12 pages; 12/24/9.
U.S. PTO Office Action for U.S. Appl. No. 11/199,964; 15 pages; May 25, 2010.
Notice of Allowance for U.S. Appl. No. 11/559,484; 8 pages; Jun. 20, 2011.
Notice of Allowance for U.S. Appl. No. 11/559,484; 8 pages; Dec. 13, 2011.
USPTO Office Action for U.S. Appl. No. 11/559,829, mailed Nov. 3, 2009; 22 pp.
Notice of Allowance for U.S. Appl. No. 11/559,829; Jan. 10, 2012; 14 pages.
U.S. PTO Office Action for U.S. Appl. No. 11/559,933; 23 pages; Mar. 2, 2012.
UK Office Action for Application No. 0910202.1 dated Dec. 21, 2010; 7 pages.
GB Office Action for Application No. GB0910202.1; 4 pages; Jul. 11, 2011.
Extended EP Search report for Application No. 07871467.2; 8 pages, Feb. 10, 2012.
Notice of Allowance for U.S. Appl. No. 11/406,783; 6 pages; 9/28/9.
Notice of Allowance for U.S. Appl. No. 11/199,831; 5 pages; 10/21/9.
Notice of Allowance for U.S Appl. No. 11/686,354; Apr. 29, 2010; 6 pages.
Notice of Allowability for U.S. Appl. No. 11/199,835; Apr. 10, 2010; 2 pages.
Canadian Examination Report for CA Application No. 2613335; 4 pages; Oct. 13, 2009.
AU Examination Report for AU Application No. 2007216729; 5 pages; Dec. 3, 2008.
Notice of Acceptance for AU Application No. 2010214792 dated Aug. 3, 2011; 3 pages.
JP Office Action for Application No. 2008-520389; Jan. 24, 2012; 5 pages (includes English Translation).
AU Examination Report for AU Application No. 2007319235; Mar. 13, 2012; 2 pages.
JP Office Action for Application No. 2008-520391; Apr. 10, 2012; 6 pages total with English Translation.
Notice of Allowance for U.S. Appl. No. 11/559,484; 17 pages; Jun. 1, 2012.
Notice of Allowance for U.S. Appl. No. 11/559,829; May 11, 2012; 10 pages.
AU Examination report for Application No. 2011203051; May 28, 2012; 4 pages.
CA Examination Report for Application No. 2754756; 6 pages; May 29, 2012.
EP Office Action for Application No. 06786486.8; 5 pages; May 14, 2012.
EP Office Action for Application No. 06786483.5; 7 pages; May 14, 2012.
U.S. PTO Office Action for U.S. Appl. No. 12/647,887; Aug. 3, 2012; 9 Pages.
Notice of Allowance for U.S. Appl. No. 12/685,381; 7 pages; Sep. 12, 2012.
Solutions for Restaurants, Hotels & Resorts and Clubs—Guestbridge, Inc. (online). Guestbridge, Inc. Feb. 6, 2007 [retrieved on Aug. 21, 2008]. Retrieved from the Internet: <URL:http://web.archive.org/web/20070206134139/www.guestbridge.com/solutions.html, entire document especially p. 1.
United States Patent and Trademark Office: Office Action for U.S. Appl. No. 11/199,835, filed Aug. 9, 2005; in the name of Lee M. Amaitis, 17 pages; Mar. 2, 2007.
Gaming Labs Certified™; Standard Series; *GLI-11: Gaming Devices in Casinos*; Version: 2.0; 96 pages; Apr. 20, 2007.
Janna Lindsjö, et al.; *GIGANT—an Interactive, Social, Physical and Mobile Game*; PDC 2002 Proceedings of the Participatory Design Conference; Malmö, Sweden; 5 pages; Jun. 23-25, 2002.
Business Wire; Home Gambling Network Inc., With U.S. Patent 5,800,268—Business/Gambling—HGN and UUNET, a WorldCom/MCI Company, Reach a Mutually Satisfactory Resolution in Patent Suit; 2 pages; Mar. 19, 1999.
PR Newswire; Nokia N-Gage (TM) Mobile Game Deck—The Revolutionary Gaming Experience; Major Global Games Publishers Excited to Publish on Wireless Multiplayer Platform; 3 pages; Feb. 6, 2003.
Business Wire; GoldPocket Interactive Launches EM Mobile Matrix, Industry's First Fully Synchronous Interactive Television and Massively Multi-Player Gaming Solution; 2 pages; Mar. 17, 2003.
Brand Strategy; The National Lottery has announced that UK consumers will be able to purchase tickets using the internet, TV and Mobile phones. (Launches & Rebrands); ISSN 0965-9390; 1 page; Apr. 2003.
PR Newswire; Ideaworks3D appointed by Eidos Interactive to Develop Blockbuster Line-up for Nokia N-Gage Mobile Game Deck; 2 pages; May 23, 2003.
Telecomworldwire; *New mobile lottery service launched by mLotto*; 1 page; Oct. 30, 2003.
Singh, et al.; *Anywhere, Any-Device Gaming*; Human Interface Technology Laboratory; National University of Singapore; 4 pages; 2004.
Wu, et al; The Electronic Library; *Real Tournament—Mobile Context-Aware Gaming for the Next Generation*; vol. 22; No. 1; ISBN 0-86176-934-1; ISSN 0264-0473; 11 pages; 2004.
*Precision Marketing*; vol. 16, No. 11; ISSN 0955-0836; 2 pages; Jan. 9, 2004.
Online Reporter; *GTECH Takes Lottery Mobile*; 1 page; Feb. 28, 2004.
Personal and Ubiquitous Computing; Human Pacman: a mobile, wide-area entertainment system based on physical, social, and ubiquitous computing; 12 pages; May 2004.
PR Newswire; M7 Networks Partners With Terraplay to Deliver Real-Time Multiplayer Gaming Functionality to Its Community Services Offerings; 2 pages; Jun. 1, 2004.
China Telecom; Win Win Gaming Inc. announces agreement to provide wireless lottery and entertainment content in Shanghai; vol. 11, No. 9; 2 pages; Sep. 2004.
Business Wire; EA Announces Next Step Into Mobile Gaming; Digital Bridges Named as Strategic Partner for Distribution of Mobile Interactive Entertainment in Europe, North and South America; 3 pages; Sep. 2, 2004.
Wireless News; Mobile Casinos, Lotteries Good News for Mobile Revenues; 2 pages; Feb. 23, 2005.
Business Wire; MobileGamingNow, Inc. Announces the Launch of the First Ever Mobile Phone Interactive, Multi-Player Gaming System for Poker; 2 pages; Apr. 4, 2005.
Business Wire; InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters; 2 pages; Apr. 21, 2005.
Business Wire; July Systems' Play2Win Interactive Game Service Launched on UK's MobileGaming.com; Speedy Customer Deployments Now Possible With July's New UK Mobile Retailing Infrastructure; 2 pages; May 4, 2005.
Gaming Labs Certified™; Standard Series; GLI-26: Wireless Gaming System Standards; Version: 1.1; 28 pages; Jan. 18, 2007.

Notification of Transmittal of the International Search Report and the Written Opinion of the International Searching Authority, or the Declaration, for International Application No. PCT/US06/26343, 8 pages, Jan. 19, 2007.
USPTO Office Action for U.S. Appl. No. 11/418,939, Dec. 17, 2007 (13 pages).
USPTO Office Action for U.S. Appl. No. 11/418,939, Aug. 20, 2008 (12 pages).
USPTO Office Action for U.S. Appl. No. 11/418,939, Apr. 10, 2007.
PCT Notification of Transmittal of the International Search Report and the Written Opinion of the International Searching Authority for International Application No. PCT/US2008/057239; 8 pages; Aug. 7, 2008.
PCT Notification of Transmittal of the International Search Report and the Written Opinion of the International Searching Authority for International Application No. PCT/US07/66873; 4 pages; Aug. 4, 2008.
Notice of Allowance for U.S. Appl. No. 113/586,142; 8 pages; Dec. 24, 2012.
US PTO Office Action for U.S. Appl. No. 13/615,440; 17 pages; Jan. 15, 2013.
U.S. PTO Office Action for U.S. Appl. No. 11/199,831; 9 pages; Dec. 19, 2008.
U.S. PTO Office Action for U.S. Appl. No. 11/406,783; Feb. 9, 2009.
U.S. PTO Office Action for U.S. Appl. No. 11/686,354; Oct. 1, 2009; 9 pages.
Notice of Allowance for U.S. Appl. No. 11/406,783; 6 pages; Sep. 28, 2009.
Notice of Allowance for U.S. Appl. No. 11/199,831; 5 pages; Oct. 21, 2009.
USPTO Office Action for U.S. Appl. No. 11/559,829, mailed Nov. 3, 2009, 22 pp.
USPTO Office Action for U.S. Appl. No. 11/559,933, mailed Oct. 20, 2009, 17 pp.
USPTO Office Action for U.S. Appl. No. 11/559,484, mailed Nov. 3, 2009, 31 pp.
Notice of Allowance for U.S. Appl. No. 11/686,354; Apr. 29, 2010; 6 pages.
Notice of Allowability for U.S. Appl. No. 11/199,835; Apr. 10, 2009; 2 pages.
AU Examination Report for AU Application No. 2006269413; 2 pages; Apr. 29, 2009.
Canadian Examination Report for CA Application No. 2613335; 4 pages; Mar. 29, 2010.
AU Examination Report for AU Application No. 2007216729; 5 pages; Jan. 16, 2009.
U.S. PTO Office Action for U.S. Appl. No. 11/559,829; 29 pages; Jun. 22, 2010.
AU Examination Report for AU Application No. 2007319235; Jul. 6, 2010; 2 pages.
AU Examination Report for AU Application No. 2006269416; 4 pages; Jun. 10, 2009.
U.S. PTO Office Action for U.S. Appl. No. 11/559,484; 19 pages; Jul. 20, 2010.
U.S. PTO Office Action for U.S. Appl. No. 11/559,933; 37 pages; Jul. 20, 2010.
CA Examination Report for CA Application No. 2613333; Aug. 30, 2010; 4 pages.
NZ Examination Report for NZ Application No. 577177; Dec. 17, 2010; 2 pages.
CA Examination report for CA Application No. 2596474; Nov. 15, 2010; 6 pages.
Notice of Allowance for U.S. Appl. No. 11/686,354; Mar. 3, 2011; 8 pages.
U.S. PTO Office Action for U.S. Appl. No. 12/247,623; 10 pages; Mar. 21, 2011.
Notice of Acceptance for AU Application No. 2006269416 dated Mar. 9, 2011; 3 pages.
Notice of Acceptance for CA Application No. 2613335 dated Apr. 4, 2011; 1 pages.

JP Office Action for Application No. 2008-520391; Feb. 1, 2011; 7 pages total with English Translation.
Notice of Acceptance for AU Application No. 2006269413 dated Feb. 7, 2011; 3 pages.
JP Office Action for Application No. 2008-520389; Jan. 18, 2011; 6 pages total with English Translation.
Notice of Allowance for U.S. Appl. No. 11/559,484; 8 pages; Nov. 23, 2010.
Notice of Allowance for U.S. Appl. No. 11/418,939; 27 pages; Mar. 9, 2009.
AU Examination Report for Application No. 2010214792 dated May 18, 2011; 2 pages.
EP Office Action for Application No. 07760844.6 dated Jan. 5, 2009; 7 pages.
Notice of Acceptance for Application No. 2010214792 dated Aug. 3, 2011; 3 pages.
U.S. PTO Office Action for U.S. Appl. No. 12/324,221; 13 pages; Aug. 10, 2011.
U.S. PTO Office Action for U.S. Appl. No. 12/324,269; 14 pages; Aug. 15, 2011.
Notice of Allowance for CA Application No. 2613333; 1 pages; Jul. 20, 2011.
Notice of Allowance for U.S. Appl. No. 12/324,221; 7 pages; Dec. 28, 2011.
Notice of Allowance for U.S. Appl. No. 12/324,269; 7 pages; Dec. 6, 2011.
AU Examination Report for Application No. 2011202267; 2 pages; Nov. 30, 2011.
Notice of Allowance for U.S. Appl. No. 12/247,623; Jan. 24, 2012; 8 pages.
U.S. PTO Office Action for U.S. Appl. No. 12/647,887; Jan. 23, 2012; 11 pages.
U.S. PTO Office Action for U.S. Appl. No. 12/792,361; Feb. 13, 2012; 14 pages.
U.S. PTO Office Action for U.S. Appl. No. 12/685,381; 8 pages; Feb. 28, 2012.
Notice of Acceptance for AU Application No. 2011202267; 3 pages; Mar. 6, 2012.
Notice of Allowance for U.S. Appl. No. 12/324,269; 9 pages; Mar. 22, 2012.
NZ Examination Report for NZ Application No. 577177; Jun. 29, 2012; 2 pages.
U.S. PTO Office Action for Application No. 12/792,361; Sep. 26, 2012; 14 pages.
U.S. PTO Office Action for U.S. Appl. No. 13/616,356; 8 pages; Dec. 4, 2012.
CA Examination report for CA Application No. 2596474; Mar. 20, 2012; 1 page.
Notice of Allowance for U.S. Appl. No. 11/559,484; 17 pages; Oct. 12, 2012.
U.S. PTO Final Office Action for U.S. Appl. No. 11/559,933; 24 pages; Dec. 6, 2012.
AU Examination Report for AU Application No. 2007319235; Apr. 16, 2012; 2 pages.
Yampolskiy et al., 2006, "Use of Behavioral Biometrics in Intruction detection and Online Gaming", Biometric technology for Human Identification III, edited by Patrick J. Flynn, Sharath Pankanti, Proc. Of SPIE vol. 6202, 62020U-1-10.
NZ Examination Report for NZ Application No. 577177; Oct. 12, 2012; 2 pages.
NZ Examination Report and Notice of Acceptance for NZ Application No. 577177; Nov. 6, 2012; 2 pages.
NZ Examination Report for NZ Application No. 600525; Jun. 14, 2012; 2 pages.
Notice of Allowance for U.S. Appl. No. 11/559,829; Oct. 9, 2012; 9 pages.
Notice of Allowance for U.S. Appl. No. 12/685,381; Jan. 9, 2013; 16 pages.

* cited by examiner

SYSTEMS AND METHODS FOR PROVIDING ACCESS TO WIRELESS GAMING DEVICES

CROSS REFERENCE TO RELATED APPLICATION

This application is a continuation of U.S. patent application Ser. No. 11/418,939 (U.S. Patent Application Publication No. 2007-0257101), entitled "SYSTEMS AND METHODS FOR PROVIDING ACCESS TO WIRELESS GAMING DEVICES," by Dean Alderucci et al., and filed May 5, 2006 now U.S. Pat. No. 7,549,576, which is hereby incorporated by reference herein in its entirety.

FIELD OF THE INVENTION

The present invention relates generally to the field of gaming and, more particularly, to a gaming system and method incorporating a wireless network and systems and methods for providing access thereto.

BACKGROUND OF THE INVENTION

Virtual casinos are accessible via communications networks such as the Internet. For example, on-line casinos present a graphical representation of games, such as casino games, to a user on the screen of a computer in communication with the Internet. The user may place wagers, participate in the gaming, and win or lose money. Receipt of winnings, or payment of losses is typically handled through a credit account.

Participants may use gaming devices, some of which may be wireless, to access such on-line casinos. However, security of wireless gaming devices (e.g., handhelds such as the Blackberry™ handheld device) may be sub-optimal as it is typically accomplished through soft checks. For example, a user may be merely asked to enter a valid user name and associated password to provided access to a particular gaming device.

It would therefore be desirable to provide mechanisms that better guarantee secure access to wireless gaming devices and gaming systems.

SUMMARY OF THE INVENTION

Therefore, it is an object of the invention to provide mechanisms that better guarantee secure access to wireless gaming devices and gaming systems.

This and other objects are accomplished in accordance with the principles of the invention by providing gaming networks with one or more levels of security checks, such as a hard security check, instead of, or in addition to, a soft security check before access to a gaming device is granted. In a hard security check, the user employs an apparatus such as a card or other physical token that can be used to access the gaming device. Such an apparatus may communicate information that identifies the user to the device or may be used to produce a signal without which the device is locked.

In some embodiments of the present invention, a device capable of detecting or reproducing a signal from an apparatus is provided. Access to the device is provided when the signal is detected. Alternatively or additionally, the signal may include identifying information that needs to be verified in order to provide access to the device. The apparatus may include a medium for storing identifying information as well as an emitter for communicating the identifying information to the device such that access to the device is provided when the identifying information is associated with a user that is authorized to operate the device.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE INVENTION

A convenience gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The convenience gaming system may be implemented over a communications network such as a cellular network or a private wireless and/or wireline network. Examples of the latter include WiFi and WiMax networks. In some embodiments, the convenience gaming system communications network is entirely independent of the Internet. In other embodiments, the convenience gaming system operation makes minimal use of the Internet, such that only information for which there is no security issues is transmitted via the Internet and/or information may be encrypted. Preferably, the communications network enables players to participate in gaming from remote locations (e.g., outside of the gaming area of a casino). Also, the system may enable players to be mobile during participation in the convenience gaming activities. Preferably, the system has a location verification or determination feature, which is operable to permit or disallow gaming from the remote location depending upon whether or not the location meets one or more criteria. The criterion may be, for example, whether the location is within a pre-defined area in which gaming is permitted by law.

Figure 1:
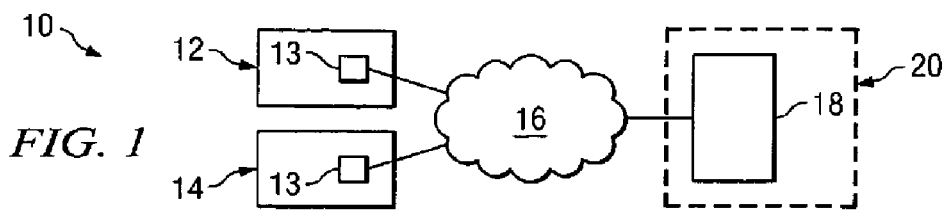
FIG. 1 illustrates a convenience gaming system according to certain embodiments of the present invention.

As shown n FIG. 1, for example, convenience gaming system 10 includes at least one user 12. The system may include additional users such that there is at least a first user 12 and a second user 14. Multiple users may access a first convenience gaming system 10, while other multiple users access a second convenience gaming system (not shown) in communication with first gaming system 10. Users 12 and 14 preferably access system 10 by way of a gaming communication device 13. Gaming communication device 13 may comprise any suitable device for transmitting and receiving electronic communications. Examples of such devices include, without limitation, mobile phones, PDAs, computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 is not critical, however, and computer 18 may reside adjacent to or remote from the domain of gaming service provider 20. Moreover, in certain embodiments, a gaming service provider is not required. The computer 18 and/or gaming service provider 20 may reside within, adjacent to, or remote from a gaming provider (not shown in FIG. 1). The gaming provider may be an actual controller of games, such as a casino. As an example, a gaming service provider may be located on the grounds of a casino and the computer 18 may be physically within the geographic boundaries of the gaming service provider. As discussed, however, either possibilities exist for remote location of the computer 18 and the gaming service provider 20. Computer 18 may function as a gaming server. Additional computers (not expressly shown) may function as database management computers and redundant servers, for example.

Preferably, software resides on both the gaming communication device 13 and the computer 18. Software resident on gaming communication device 13 is preferably operable to present information corresponding to gaming activities (including gambling and non-gambling activities discussed herein) to the user. The information includes, without limitation, graphical representations of objects associated with the activities, and presentation of options related to the activities and selectable by the user. The gaming communication device software is also preferably operable to receive data from the computer and data input by the user or information communicated through another device or apparatus. Software resident on the computer is preferably able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are within the scope of the present invention. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In at least one embodiment, the communication of gaming information may take place through the Internet or without involvement of the Internet. In certain embodiments, a portion of the gaming information may be transmitted over the Internet. Also, some or all of the gaming information may be transmitted partially over an Internet communications path. In certain embodiments, some information is transmitted entirely or partially over the Internet, but the information is either not gaming information or is gaming information that does or does not need to be maintained secretly. For instance, data that causes a graphical representation of a table game on the user's gaming communication device might be transmitted at least partially over the Internet, while wagering information transmitted by the user might be transmitted entirely over a non-Internet communications network. As another example, identifying information associated with a hard check apparatus (e.g., a bracelet as discussed below) may or may not be transmitted from the gaming communication device to a server over the Internet.

Figure 2:
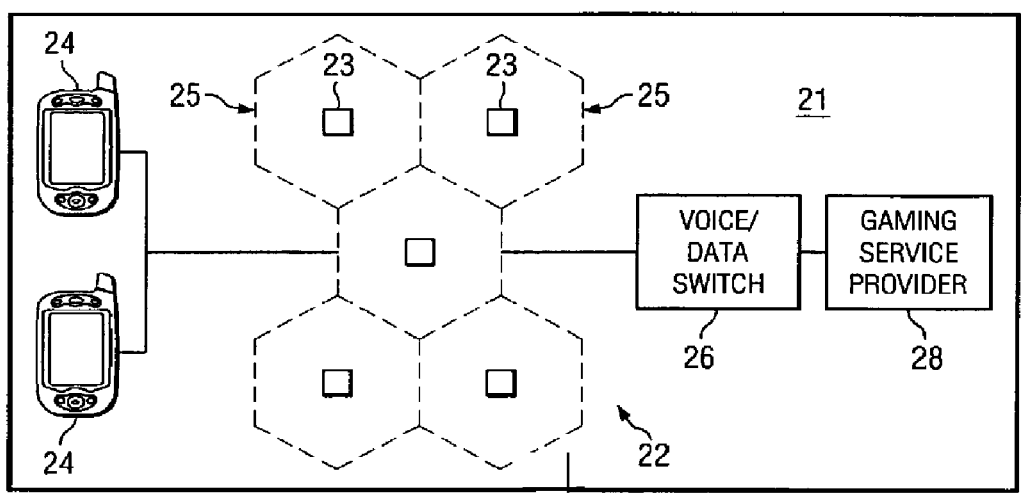
FIG. 2 illustrates a convenience gaming system with a wireless network according to certain embodiments of the present invention.

According to some embodiments of the invention, as shown in FIG. 2 for example, the communications network 21 comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the convenience gaming system and participate in the activities available on the convenience gaming system. Users are connected to the network of base stations via transmission and reception of radio signals. The communications network also includes at least one voice/data switch 26, which is preferably connected to the wireless portion of the network via a dedicated, secure landline. The communications network also includes a gaming service provider 28, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the convenience gaming system by way of mobile stations which are in communication with, and thus part of, the communications network. The mobile station may be any electronic communication device that is operable in connection with the network as described. For example, in this particular embodiment, the mobile station may comprise a cellular telephone.

Preferably, in the case of a cellular network for example, the convenience gaming system is enabled through the use of a private label carrier network. Each base station is programmed by the cellular carrier to send and receive private secure voice and/or data transmissions to and from mobile station handsets. The handsets are preferably preprogrammed with both gaming software and the carrier's authentication software. The base stations communicate via Private T-1 lines to a switch. A gaming service provider leases a private T-1 or T-3 line, which routes the calls back to gaming servers controlled by the gaming service provider. Encryption can be installed on the telephones if required by a gaming regulation authority, such as a gaming commission.

The cellular network is preferably a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices are preferably not allowed to "connect" to the Internet. This ensures a high level of certainty that bets/wagers originate and terminate within the boundaries of the gaming jurisdiction and the "private" wireless system cannot be circumvented or bypassed. In certain embodiments, some data and/or voice traffic may be communicated at least partially over the Internet. In some embodiments, certain non-gaming information may be transported over a path which includes the Internet, while other information relating to the gaming activities of the system is transported on a path that does not include the Internet.

Figure 3:
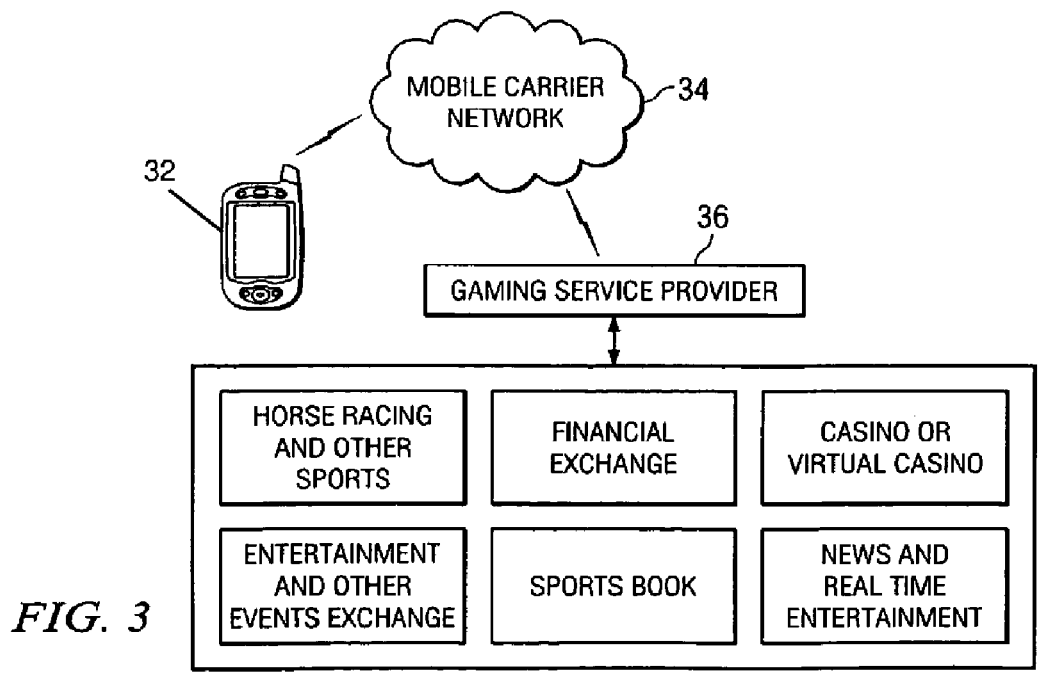
FIG. 3 is a block diagram of a convenience gaming system illustrating various gaming activities in accordance with certain embodiments of the present invention.

As shown in FIG. 3, a gaming communication device 32 is in communication with a gaming service provider 36 over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential convenience activities.

Figure 4:
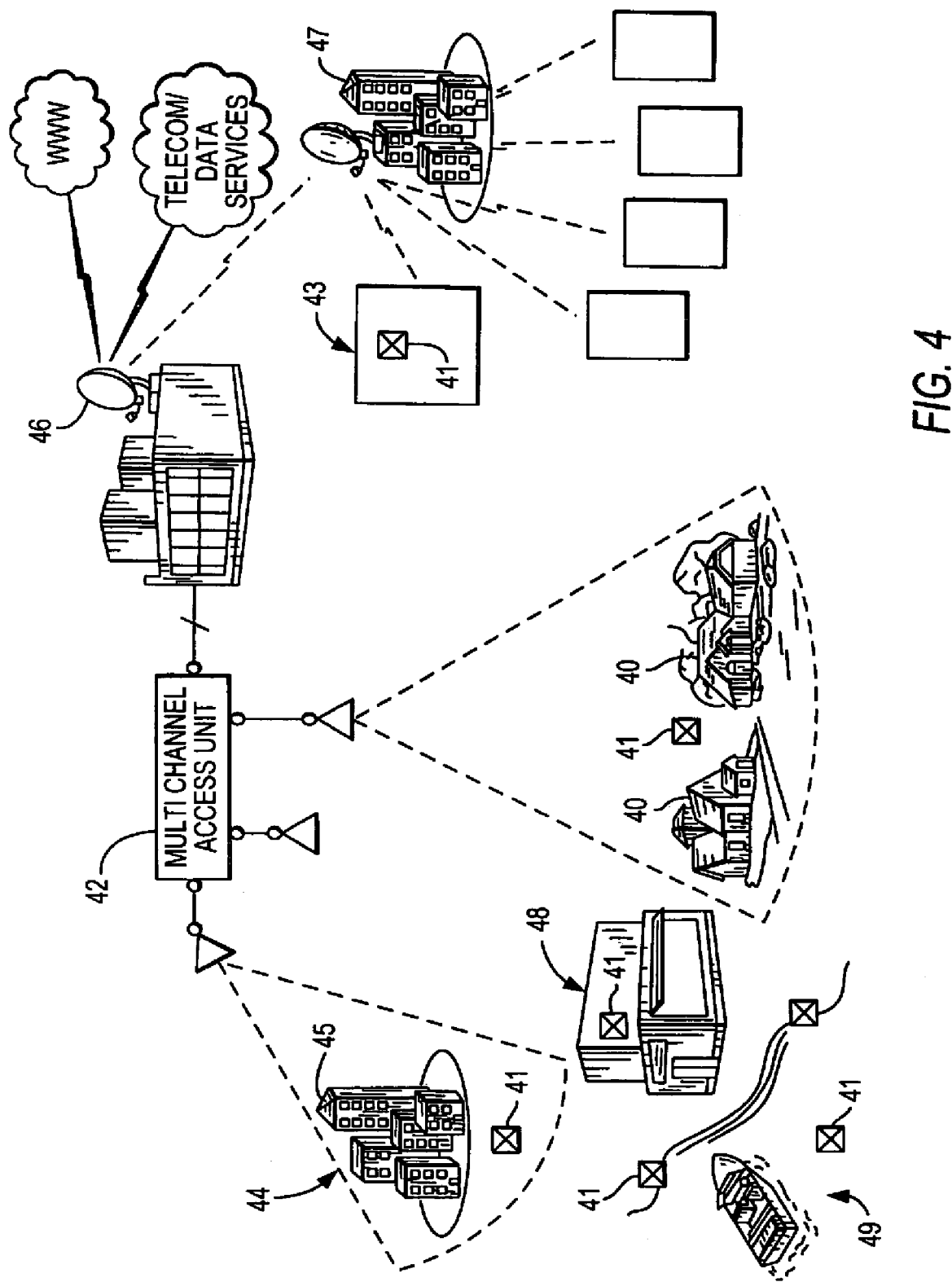
FIG. 4 illustrates a convenience gaming system showing coverage areas in accordance with certain embodiments of the present invention.

In other embodiments of the invention, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a convenience gaming system may comprise a combination of networks as depicted in FIG. 4. For example, there is shown a combination of private wireless networks 44, a cellular network comprising a multi-channel access unit or sectorized base station 42, and a satellite network comprising one or more satellites 46.

With respect to the private wireless network, because the preferable technology covers smaller areas, (e.g., in the range of 100-300 feet) and provides very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote convenience gaming areas 43. The configuration of the overall convenience gaming system depicted in FIG. 4 is intended only as an example and may be modified within the scope of the invention.

In some embodiments of the invention, the system architecture for the convenience gaming system includes:

(1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the gaming service provider);

(c) compulsory tunneling (static routing) to gaming services;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T-1 and T-3 lines to provide connectivity where wireless services cannot reach; and (4) redundant private-line communications from the mobile switch back to the gaming server.

Each of the "Game Spots" or "Entertainment Spots" are preferably connected via the MWAN/MAN back to central and redundant game servers. For accessing the private wireless networks 41, the gaming communication devices are preferably WiFi- or WiMax-enabled PDAs or mini-laptops, and do not have to be managed by a third-party partner.

Preferably, the convenience gaming system includes a location verification feature, which is operable to permit or disable gaming from a remote location depending upon whether or not the location meets one or more criteria. The criterion may be, for example, whether the location is within a pre-defined area in which gaming is permitted by law. As another example, the criterion may be whether the location is in a no-gaming zone, such as a school. The location verification technology used in the system may include, without limitation, "network-based" and/or "satellite-based" technology. Network-based technology may include such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In some embodiments, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
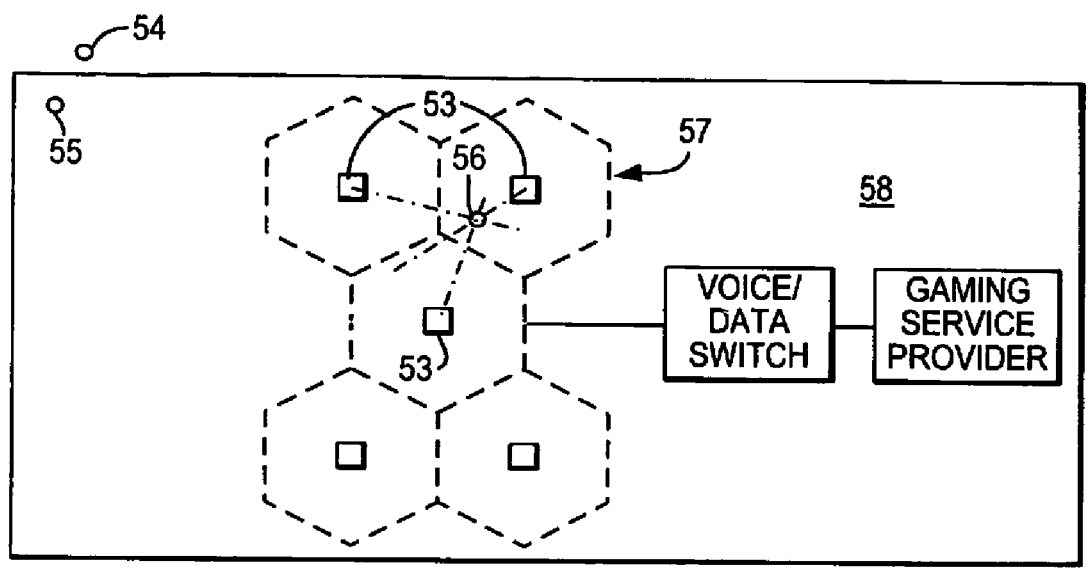
FIG. 5 illustrates a convenience gaming system with a wireless network showing triangulation location determination in accordance with certain embodiments of the present invention.

As shown in FIG. 5, the convenience gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the convenience gaming system, the geo-fence 57 ensures that no gaming communication devices outside jurisdiction 58, such as device 54, are permitted access.

Geo-fencing does not specify location. Rather, it ensures that a mobile station is within certain boundaries. For instance, geo-fencing may be used to ensure that a mobile station beyond state lines does not access the convenience gaming system. Triangulation on the other hand specifies a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In other embodiments, location verification is accomplished using channel address checking or location verification using some other identifying number or piece of information indicative of which network or portion of a network is being accessed by the gaming communication device. Assuming the using of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In related embodiments, the identifying number for information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. Preferably the gaming service provider either maintains, or has access to, a database that maps the various possible worldwide mobile network identifying numbers to geographic areas. The invention contemplates using any number or proxy that indicates a network portion of a network, or network component, which is being connected with a mobile telephone. The identifying number may indicate one or more of a base station or group of base stations, a line, a channel, a trunk, a switch, a router, a repeater, etc.

In other embodiments of the present invention, when the user connects his telephone to the gaming server, the gaming server draws the network identifying information and communicates that information into the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

In connection with FIG. 6, an example embodiment of a method according to the invention can be described as follows. As discussed, software is preferably loaded on a gaming communication device and is operable to receive input data for gaming. The input data may originate at associated gaming software resident on the gaming server, or it may be input by the user of the gaming communication device. The software on the device is operable to present a representation of a gaming environment. This can include, among other things, a representation of a table game such as a blackjack table or a slot machine. Other examples of the representation of a gaming environment include graphical representations of any of the other applications described herein.

Figure 6:
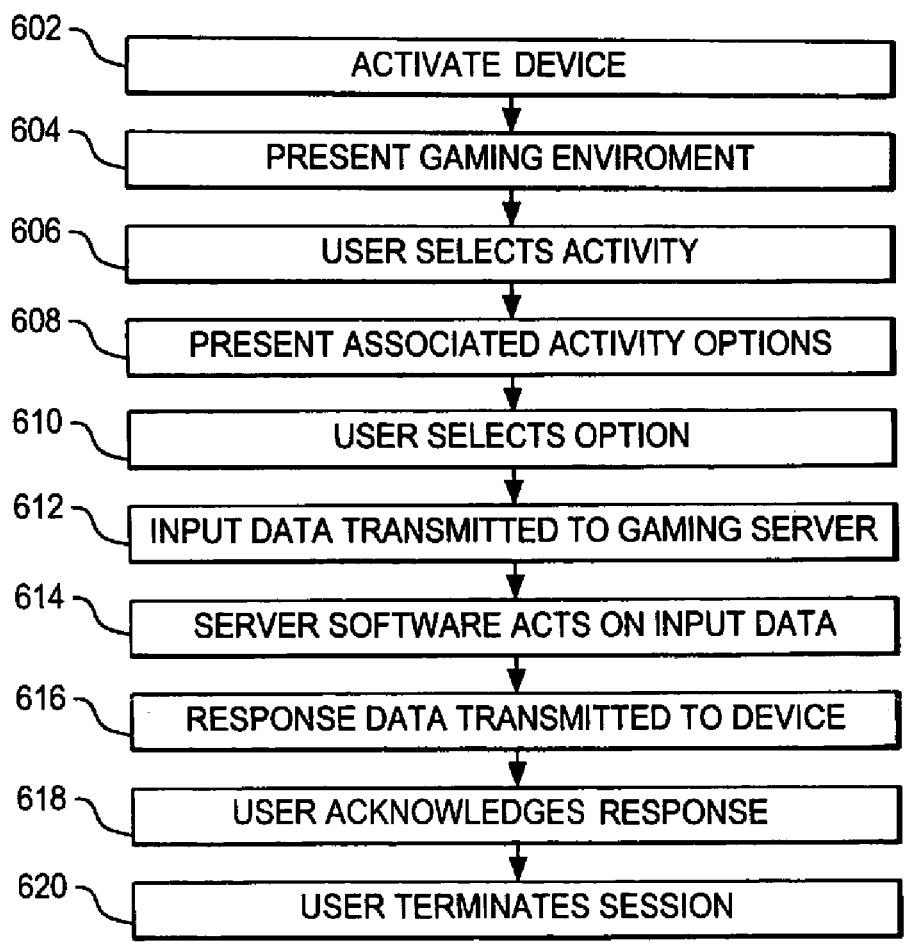
FIG. 6 is a flow chart depicting steps in a convenience gaming method according to certain embodiments of the present invention.

In the example method shown in FIG. 6, in a first step 602, the gaming communication device is activated. This may take place as a function of turning on a phone, PDA, or other communication device as described elsewhere herein. Preferably, activation comprises connecting the gaming communication device to a private data network. Part of the activation includes logging in at a prompt. This may be considered as a first level of authentication of a user of the gaming communication device. A second level of user authentication comprises authentication of the gaming communication device itself. This may occur, for example, by authentication of a mobile station by a mobile carrier. A third level of user identification may comprise biometrics. Various examples of biometrics may include, but are not limited to, fingerprint identification, photo identification, retina scanning, voice print matching, etc.

In a next step 604, the user is presented with the gaming environment. The gaming environment may be presented in various stages. For instance, in a first stage, the gaming environment may comprise a casino lobby where the user is presented with certain gaming options including, for example, table games, slots, sports book, video poker, and a casino cashier. In a subsequent stage, the user may be presented with optional instances of the type of activity selected from the casino lobby.

In a next step 606, the user selects an activity, such as a particular casino table game. In step 608, the user is presented with one or more options related to the selected activity. In step 610, the user selects an option. For instance, at this point, the user might place a wager, draw a card, select a restaurant or restaurant menu item, select a news source or a news story, place a buy or sell order on a financial exchange, place a bet on a certain box office performance over/under amount for a given movie, etc. The options for user input are myriad. In step 612, the software resident on the gaming communication device accepts the option input by the user and transmits the input data to the software resident at the gaming server. In step 614, the gaming server software acts on the input data.

Actions in this point, may include, without limitation, determining an outcome and/or amount, accessing another server and/or software application, retrieving information, preparing a response to the user, etc. The action of determining an outcome and/or amount might take place, for example, if the user is using the device to place wagers in connection with a gambling activity. For certain gambling activities, such as a table game or slot machine, a random number generator may be incorporated to determine the outcome (i.e., whether the user won or lost) and the gaming server software would also determine an amount won or lost based on the amount wagered and any applicable odds. The action of accessing another server and/or software application might occur, for example, in the event the user is engaging in a services activity such as accessing news services, making reservations and placing food and beverage orders at a restaurant, or making a retail purchase. The action of retrieving information might occur when the gaming server software is prompted to access another server for the purpose of retrieving a certain type of information requested by the user.

Preferably, the gaming server software prepares a response to the user's input data and in step 616. In step 618, the user acknowledges the response. For example, in the case of gambling, the user might acknowledge that he won a hand of blackjack because the dealer busted and that his payout was $100 based on a $50 bet at even odds. In step 620, the user logs out.

In the situation where the user is gambling, after the series of steps described in connection with FIG. 6, (or a subset or modified series of steps), the user physically enters a casino and goes to a casino cashier for payout and/or settlement (which can include, for example, extensions of credit or advance deposits). In some embodiments, there is a waiting period (e.g., twenty-four hours) before the user can collect winnings. The purpose of the waiting period is to allow time for fraud monitoring. The waiting period may depend on the amount of the balance. For example, if the user is owed less than $5,000 the waiting period may be twelve hours. If the user is owed between $5,000 and $10,000 the waiting period may be twenty-four hours. If the user is owed more than $10,000 the waiting period may be forty-eight hours.

Figure 7:
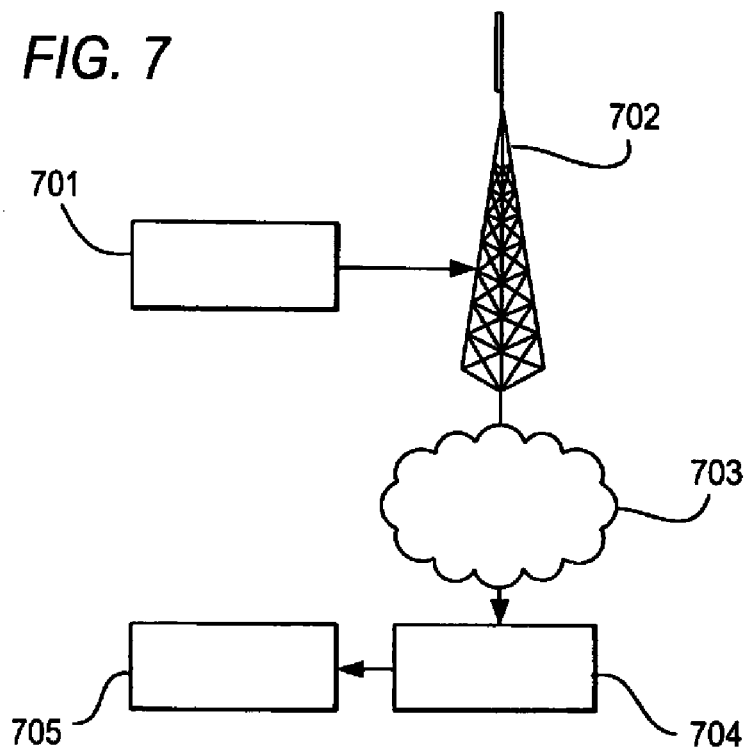
FIG. 7 depicts a convenience gaming system showing a communication path in accordance with certain embodiments of the present invention.

Preferably, data is transmitted back and forth during the convenience gaming activities between the gaming communication device and a server controlled by the gaming service provider. An example of the path of communication is shown in FIG. 7. Gaming data, such as a wager placed by the user, is transmitted from gaming communication device 701 to a base station 702 (or a transmitter in the case of a private wireless network such as a WiFi or WiMax network). Base station 702 routes the data through network 703 to a hub or gateway 704, which in turn routes the data to a gaming server 705 operated by a gaming service provider. Preferably, the communication from gaming communication device 701 to the network 703 comprises wireless communication. This may be any type of known wireless communication, or any type of wireless communication available in the future. Examples of acceptable wireless communication protocols include CDMA, GSM, and GPRS.

Preferably, the communication from the network 703 to the gateway 704 and to the server 705 are conducted over secure land line. FIG. 7 is an example communication network only and the invention should be understood to cover other networks in which data may be transmitted from gaming communication device 701 to server 705. Preferably, data in response to data being transmitted from gaming communication device 701 to server 705 is transmitted back to gaming communication device 701 along a path essentially opposite to the path of the first transmission. It should be noted that in at least certain embodiments of the methods and systems described herein, a user is not actually playing a game on the gaming communication device. Rather, the user is actually playing the game on the server controlled by the gaming service provider, which may be located within a casino, thereby interacting with the gaming device and the server. In other embodiments, the user may be playing the game on the gaming device itself or interacting solely with the device.

With respect to payment and/or receipt of winnings and losses, one possible approach is as follows. Upon check-in at a casino hotel, a hotel representative may query a guest as to whether the guest wants access to a convenience gaming device. If the guest does want such access, the hotel representative may provide the guest with a gaming communication device in exchange for a credit-card type deposit or other deposit. The guest then deposits money into an account for wireless gaming. The guest's account balance information is loaded onto the guest's account file, which is preferably maintained on the gaming server. The user may load money into his gaming account by establishing a credit account, for example, at a casino cashier and/or by paying cash to the casino cashier. Many other alternatives exist and this process is an example only. Guest accounts or gaming communication devices may be preloaded with funds. Funds may be deposited during a convenience gaming session. This may occur, for example, if a user selected a casino cashier activity from the gaming environment and instructed the cashier to add funds to the account. The finance subsystem may also utilize account card technology (such as ATM cards, credit cards, stored value cards, gift cards, etc) in order to conduct financial transactions associated with a user's account. Moreover, the user may receive or make payments remotely, by way of inputting instructions via the gaming communication device or by another remote device such as an automatic teller machine (ATM), which is in electronic communication with the gaming server or other server operated by the casino, hotel, gaming service provider or other entity involved in the convenience gaming activities. For example, a user might remotely (via the gaming communication device) place an order at a restaurant. Then, the user might make advance payment for the meal at an ATM-type machine which is operable to receive instructions corresponding to the financial transaction requirements of the convenience gaming activity of ordering food.

Electronic records of the gaming transactions undertaken by a user may be established. Preferably, this is accomplished by utilization of a keystroke log, which is an electronic record of all keystrokes made by the user. Utilization of a keystroke log in this context allows for unprecedented monitoring of a user's gaming activity. In the event of a dispute, one may refer to the keystroke log and readily determine whether, in fact, a user placed a particular wager, for example.

An additional possible aspect of the electronic record is to allow a gaming control board or other regulatory authority, access to the electronic record in a direct manner in order to conduct periodic independent monitoring of the convenience gaming activities conducted over the system. Another possible aspect is to allow policing against rigged machines. For instance, it is possible that the gaming control board (or other regulatory authority) could obtain a gaming communication device and compare their test results over time against records in the electronic record database (e.g., by comparing the results shown in the keystroke log). This essentially comprises electronic access for testing.

Figure 8:
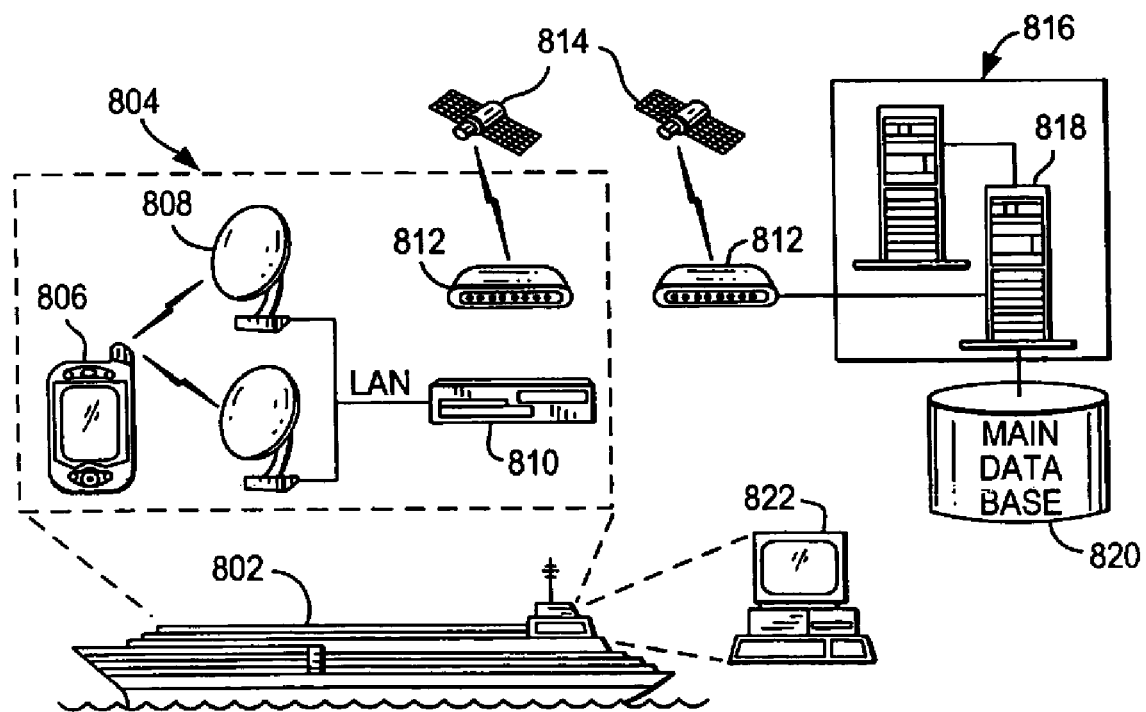
FIG. 8 illustrates a ship-based convenience gaming system in accordance with certain embodiments of the present invention.

In other embodiments of the invention, as shown in FIG. 8, a ship-based convenience gaming system is provided. The system preferably comprises passenger vessel 802, such as a cruise liner for example. The system includes one or more gaming communication devices 806 connected to a communication network. The network shown in FIG. 8 comprises a mobile network with base stations 808 connected via a LAN to a base station controller (BSC) 810. BSC 810 is connected via a T1 interface to a first Very Small Aperture Terminal (SAT) modem 812, which is in communication with a first satellite 814. First satellite 814 is operable to transmit and receive signals from second satellite 814, which is in communication with second VSAT modem 812. Second VSAT modem 812 is in communication with a gaming server 818 located at gaming service provider 816. Gaming server is coupled to gaming database 820. Again, the network configuration depicted in FIG. 8 is for example purposes only, and other configurations are within the scope of the invention. An on-board back office 822 is preferably provided. Data is communicated by the on-board VSAT modem and transmitter to the first satellite for relay to the second (preferably land-based) VSAT receiver and modem. The data is then communicated to a server and/or centralized database via a mobile station controller (not shown).

A corresponding business model involves the gaming service provider contracting with a cruise line, which agrees to allow the gaming service provider to provide coverage throughout the cruise line's ship(s), by using repeaters for example. The gaming service provider may provide a private wireless network, in which case any revenue generated from use of or access to the private wireless network, and revenue from gaming activities, may be allocated among all or any subset of the cruise line and the gaming service provider. Alternatively, the gaming service provider may contract with a mobile carrier and a satellite provider, in which case revenue from the mobile calls, and revenue from gaming activities, may be allocated among all or any subset of the cruise line, the mobile carrier and the gaming service provider.

There are several scenarios for a user's activity relative to transactions conducted over the convenience gaming system. In one example scenario the user is in a fixed, but remote, location from the gaming server, which may be located on the premises of a casino. This may include, for instance, a situation in which the gaming communication device is a kiosk or some other communication device which is in a fixed position or which is tethered to a fixed position so that the gaming communication device cannot be moved beyond a certain area. In another example scenario, the user starts a convenience gaming transaction at a first location and ends the transaction at a second location different from the first location. In another example scenario, the user is mobile during a single convenience gaming transaction. In another example scenario, the user is mobile within a first approved area then (during the convenience gaming transaction) the user moves outside the first approved area, through an unapproved area, to a remote second approved area.

In another example embodiment, the convenience gaming system may be used to enable gaming activities involving multiple wireless users who interact with one another. For instance, the system may enable a table game (such as blackjack) in which a first user and a second user are conducting gaming transactions on the same table and in which options selected by the first user directly impact outcomes and options relative to the second user. Preferably, the gaming environment presented on the gaming communication devices of both the first and second users will indicate the existence and activity of the other respective user. Another example of multiple users interacting on the convenience gaming system is the provision of a poker game in which users place bets against one another instead of, or in addition to, placing bets against the house. Another example of interaction between users is when a first user makes restaurant reservations or purchases event tickets, thereby reducing the options available to the second user.

Preferably, the gaming service provider provides at least the following functions. First, the gaming service provider provides and controls the one or more gaming servers. These servers may be physically located within the confines of the gaming service provider or may exist at a remote location. As mentioned, the gaming servers may also be located at or near a games provider such as a casino, casino hotel, racino, cruise ship, race track, etc. The gaming service provider may also provide monitoring services such as transaction monitoring and key stroke logging services. The gaming service provider may also provide data management and security services. These services are not intended to be exhaustive and the gaming service provider may provide other services which facilitate the convenience gaming process.

It should be noted that the invention can be implemented in connection with any gaming environment or an environment for any other activity, which may be conducted electronically. The invention is not limited to Nevada or any other particular gaming jurisdiction. For instance, the invention can be employed in connection with casinos in Atlantic City, N.J., international jurisdictions, Native American gaming facilities, and "racinos" which are race tracks that also have slot machines, video lottery terminals, or other gambling devices. For example, in connection with "racinos," the invention might be used by participants who wish to play slot machine games while they are viewing race horses in the paddock area. This might be desirable in the event that the slot machine area does not allow smoking and a participant wishes to gamble from an outdoor smoking area. Alternatively, the slot machine area might permit smoking and the gambler wishes to play the slot machines from an area where he or she can avoid breathing second-hand smoke. Numerous other scenarios can be envisioned in which the gaming participant can use the invention to participate in remote gaming, while enjoying some other primary activity in a location remote from the gaming facility.

Further, the invention is not limited to gaming, but can include other applications, such as trading financial instruments, and wagering on other types of events, such as elections, award events, or any other activity. More specifically, although the invention is described in the context of remote and/or mobile gaming, the principles of the invention are applicable to any system or method that uses wireless communications or other portable devices including handheld devices such as personal digital (or data) assistants (PDAs), computers, mini-computers, pagers, wireless terminals, mobile telephones, etc. Such systems may include electronic trading systems such as those used for trading financial instruments or any commodities.

In at least one embodiment, the invention provides jurisdictional controls, which limit gaming to approved geographical areas. The invention may also include an age/identity verification feature. This can be accomplished through any applicable technique including retina scanning, finger print identification, voice print matching, or other biometrics. Identity verification can also be accomplished by having a customer take a picture of himself (e.g., by use of a digital picture phone) and transmitting the picture to the gaming service provider for comparison to a stored picture of the pre-approved user. Identity verification can also be accomplished by way of comparison of participant provided data to stored data, and execution of electronic agreements or contracts by the participant. The invention may also provide for the logging of keystrokes. In at least one embodiment, all communications are accomplished without accessing the Internet.

Mobile, remote gaming may be desirable for many reasons, some of which have already been described. The invention may allow supplementation of existing in-house gaming revenue by allowing bettors to place bets while enjoying other leisure activities such as golf, swimming, dining and shows. The invention may complement the new coinless wagering environment as bettors can play their favorite games outside the casino. The invention provides a high-speed, reliable, accurate, and secure mobile gaming environment that complies with regulatory requirements for identification and location verification of the bettor with the ability to generate key stroke logs. The invention may restrict unauthorized usage from a geographic perspective and is capable of implementation using location verification technology (e.g., geo fencing) to conform the gaming activities to legal parameters.

Consumers may benefit from an increased choice of gaming environments. Consumers will be able to bet in whatever surroundings they prefer, benefiting from the knowledge that the product is regulated, fair and secure while enjoying the gaming experience at the speed they choose without external influences, such as that which might occur within the in-house casino environment. The gaming businesses can use the invention to increase their revenue base through a new, regulated, mobile, remote channel. Customers wanting to be entertained during downtime or outside a casino will be able to play games on their gaming communication device and customers intimidated by a traditional casino environment will be able to play in private. The gaming jurisdictions may benefit from an increase in gaming an ancillary revenue growth because customers will have a more enjoyable experience.

The invention may also be used to deliver content at an increased speed compared to traditional telecommunications systems. The content may include, for example, live reports, entertainment, news, promotions and advertising.

As mentioned above, the invention provides a mobile gaming environment that complies with regulatory requirements for identification and location verification of the bettor. Moreover, the system is designed to be one hundred percent "clean" from a regulatory perspective. The software is clean in that it has not been and will not be licensed to anyone who does business illegally or otherwise operates in a "gray" area. For example, in a preferred embodiment, the software is not licensed to an entity that will illegally operate the software, or otherwise illegally do business on, the Internet. This may be desirable in that certain gaming jurisdictions will not grant gaming permits or licenses to companies that do business with, or license technology to or from, other entities known to be engaging in illegal operations.

Preferably, the system is designed such that the gaming software (or other application software operating on the system) is also one hundred percent clean from a regulatory perspective. For instance, before granting a license, a gaming jurisdiction may require that the software being used is not tainted in that it has not been used by the license applicant in violation of any laws and has not been licensed or otherwise distributed or disseminated to others who have used the software for illegal purposes, or who have been engaging in illegal activity. Therefore, it is preferred that the gaming software be clean and untainted from this perspective.

The systems and methods described herein may also be used to deliver and/or access "Rich Media" content such as, for example, sports video (live or nearly live) and audio commentary. Such may often only be distributed within specific jurisdictions. Therefore, the distribution may benefit from the inventive aspects discussed herein, particularly the location verification aspect, such as geofencing.

The gaming system and methods described herein may permit, among other things, pari-mutuel wagering, sports betting, and dissemination of news and other content. The invention also enables a casino or other gaming provider to advertise ancillary services such as shows, bars, and restaurants. The invention also enables remote reservations and purchases in connection with such services.

According to some embodiments of the invention, the convenience gaming system provides for the dissemination of real-time odds to users accessing the system.

In other embodiments, an outcome in one transaction can trigger the presentation to the user of options for a second transaction. For example, if a user wins a predetermined amount of money playing blackjack, the user might be presented with an option to purchase retail items at a casino store or to make reservations for certain services at a club. As another example, if a user uses the system to purchase show tickets, the user might be offered to make reservations at one of several restaurants within a certain proximity to the show.

In some embodiments of the invention, access to the gaming device may be restricted unless a soft check and/or a hard check are performed. For example, in a soft check process, a user may be required to enter a valid user name and associated password, whereas in a hard check mechanism, the user may employ a physical token such as a card that identifies the user to the gaming device.

Figure 9:
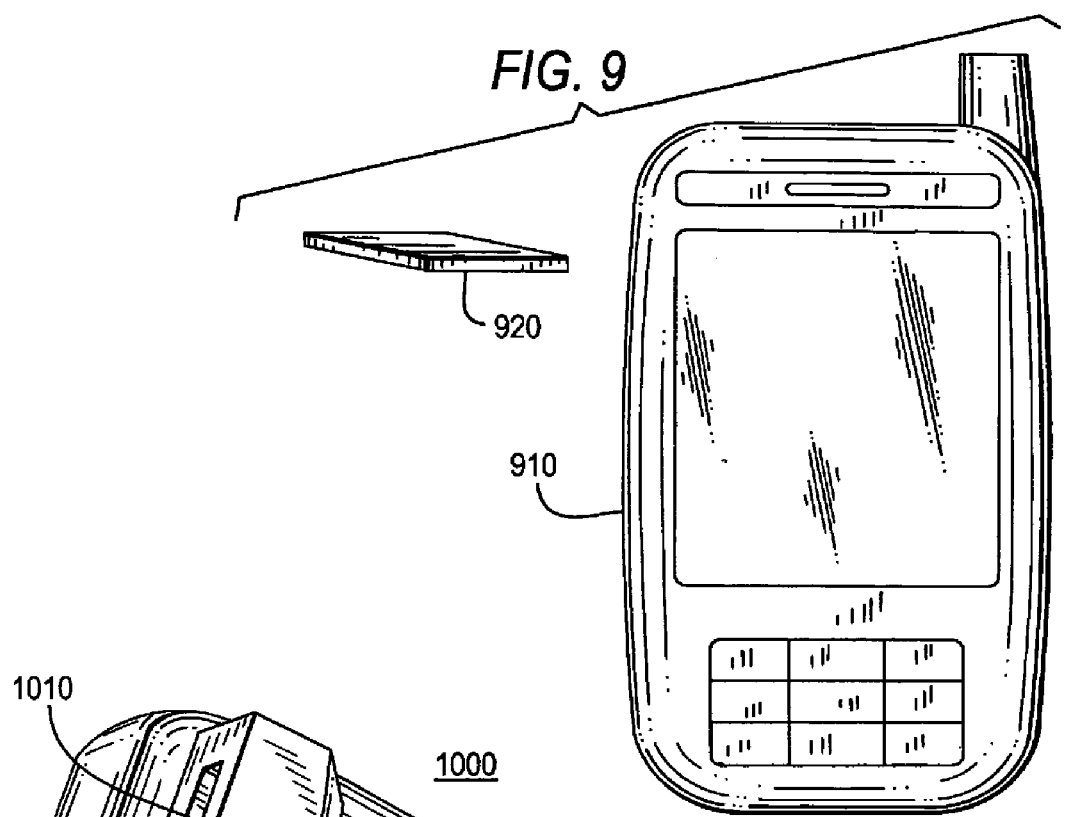
FIG. 9 illustrates a convenience gaming device and apparatus for use in accordance with certain embodiments of the present invention.

FIG. 9 illustrates an apparatus 920 to be used in conjunction with a gaming device 910 as part of a hard check mechanism according to the invention. Apparatus 920 may include any of a card which bears a magnetic strip (such as a credit card), a key that includes an RFID transponder, a limited-distance signal emitted or other transponder, a smart card that has a microprocessor or other circuit or "chip", a bracelet or wristband which includes a signal transmitter such as an RFID signal transmitter, or which includes a magnetically encoded signal, a substrate that bears a bar code or other optically readable identifier, or any combination of the same.

Figure 10:
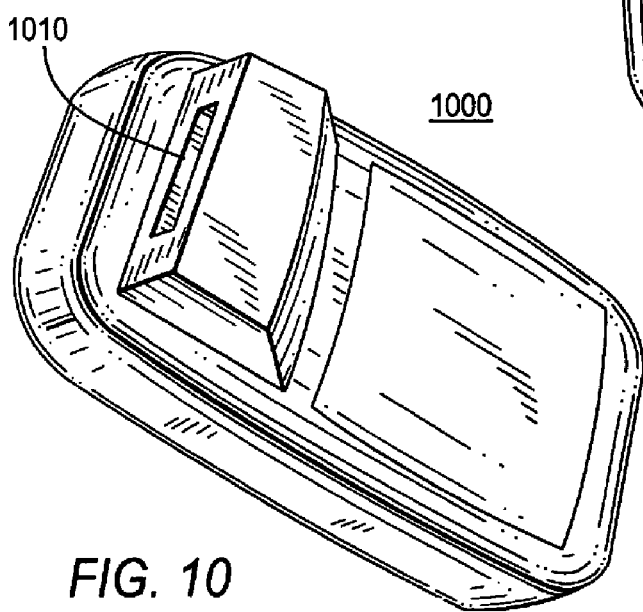
FIG. 10 illustrates a convenience gaming device and apparatus in accordance with certain embodiments of the present invention.

For example, in some embodiments of the invention, apparatus 920 may be a magnet or a card bearing a magnetic strip (such as a credit card) or a smart card that has a microprocessor or other circuit or "chip" and which may be read by card reader 1010, which is part of gaming device 1000, as depicted in FIG. 10. Alternatively, such a card may be read by a contact-less device (e.g., a signal reader which receives and interprets signals transmitted by the card).

Apparatus 920 may therefore be capable of producing a signal that is detectable by a gaming communication device such that access to the gaming device is provided when the signal is detected. Access to the gaming device may be provided for a predetermined period of time after the signal is initially detected or so long as the signal continues to be detected. The signal produced by apparatus 920 may additionally or alternatively communicate identifying information stored on the apparatus. Such information may be communicated through a transponder or any other suitable emitter. Access to the gaming device may be provided when the identifying information is associated with a user that is authorized to operate the gaming communication device. Such identifying information may be stored on apparatus 920.

Moreover, the signal produced by apparatus 920 may additionally or alternatively communicate characteristics associated with the authorized user. These characteristics may include the average volume wagered by the user, whether the user is a high-volume, medium-volume or low-volume wagerer, the user's wagering performance, whether the user is a member of a club affiliated with the organization that distributed the apparatus to the user. User characteristics may be stored and updated on apparatus 920 and/or device 910 as the user enters into more wagers and transactions, thereby enabling the provision of yet another layer of security for the device. For example, even after the initial soft and hard checks are successful, the user may subsequently be denied access to device 910 if the updated information does not fall within a predetermined range of acceptable characteristics or does not substantially match ongoing wagering requirements within a predetermined degree of tolerance. Alternatively or additionally, a certain number of deviation occurrences, which may be communicated by device 910 or merely calculated based on the updated characteristics as communicated by device 910, may trigger an alarm signal generated at a security center. This signal may lead to increased surveillance of the user or may cause security or gambling facility personnel to take action vis-a-vis the user.

Alternatively, the signal produced by apparatus 920 may be compatible with a certain class of devices (e.g., gaming devices associated with a relatively higher limit, if at all, on the amounts allowed to be wagered). Before being provided with the apparatus, a user may be required to provide identifying information (e.g., a user I.D.). Upon receipt of this information, a provider such as a gambling facility, may retrieve a user record or profile containing characteristics associated with the user and the information provided. The user may then be provided with an apparatus that corresponds to the retrieved characteristics. An example of such a verification process relating to wagering is discussed below.

In some embodiments of the invention, apparatus 920 does not produce any signal. Instead, apparatus 920 may be a storage device or storage medium such as tape, memory, a disk, etc. and gaming device 910 may have a reader capable of extracting information such as a compact disk or other disk or tape reader, or any other card reader or device capable of extracting information stored on such a storage mechanism.

In some embodiments of the invention, apparatus 920 may also serve other functions. In addition to, or as an alternative to, securing access to a wireless gaming device, apparatus 920 may use the same mechanisms described herein to communicate with a gaming station or other interface. For example, apparatus 920 may be associated with information that grants the user access to certain non-mobile gaming devices, certain areas within a casino or a hotel, a particular nightclub or restaurant, a particular room or suite, etc., or serve as a user or player tracking card, e.g., a "comp card".

Figure 11:
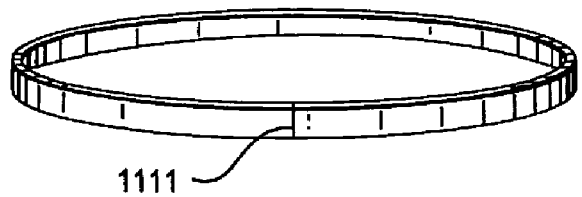
FIG. 11 illustrates another convenience gaming device in accordance with certain embodiments of the present invention.

In other embodiments of the invention, apparatus 920 may be a bracelet or wristband such as bracelet 1100 depicted in FIG. 11. Bracelet 1100 can be made of many types of material, such as rubber, plastic, metal or any combination thereof. Bracelet 1100 may be adapted for single-use or multiple uses. The ends of the bracelet may be attachable at point 1111 such that the bracelet can be affixed to or worn on, e.g., the wrist of a user of the game device. For example, bracelet 1100 may have adhesive on one end, allowing that end to be adhered to the other end when the bracelet is formed into a loop around the user's wrist.

The bracelet may include a chip, transmitter or transponder which emits a signal that identifies the user (e.g., by emitting a signal that represents a unique identifier such as a signal that represents a sequence of alphanumeric characters). In such embodiments, the bracelet, when worn by a user of the gaming device, can emit a signal that is received by the gaming device, which in turn informs the gaming device that the wireless gaming device is being used by an authorized user (e.g., the user associated with the unique identifier transmitted by the bracelet).

The bracelet may operate only for the period during which it is worn by a user. For example, the bracelet or gaming device may include a device which permits detection of whether the bracelet is in a looped position with its ends adhered to each other. This can be advantageous where it is desirable to determine, after a bracelet has been worn by a user, whether the bracelet has been removed by the user (because the ends of the bracelet are no longer in contact with each other). In some embodiments of the invention, a very low amperage current can be passed through the bracelet through a transmitter or battery in the bracelet. Thus, if the bracelet is worn by a user, the ends of the bracelet will be electrically connected and a closed circuit will be formed thereby causing current to flow through the circuit. Such a current can be detected by the gaming device. In other embodiments, the magnetic field of the circuit can be detected by the gaming device. If the circuit is broken or otherwise disengaged, indicating that the user has probably removed the bracelet, then the hard check can fail, and the user must pass the hard check in another manner (e.g., by obtaining another bracelet). The bracelet may or may not be permanently disabled upon removal.

The bracelet may have visual or other indicator or indicia associated with user characteristics. Accordingly, different users may be handed out bracelets having different colors, dimensions, sizes, styles, etc. based on their gaming, or other, traits. For example, upon verification of user identity and/or retrieval of user record, a user that wagers or trades in high volumes may be given a bracelet having a different color than that given to a user that wagers or trades in lower volumes.

In some embodiments, the gaming device may be configured to provide a recognizable visual, audio and/or other signal when access to the device is provided through the bracelet (i.e., when the hard check is successful) or merely when the device is within a certain distance from the bracelet. For example, an LED on the gaming device may be enabled when access is provided. As another example, the device may produce a blinking light, a beeping sound and/or may vibrate when the device is capable of detecting the bracelet and/or when the user actuates a locator button on the device. Actuation of such a button may also be part of a sequence of steps taken to unlock the device.

In some embodiments of the invention, the gaming device may be programmed to recognize one or more particular bracelets at the time the wireless gaming device is registered to be provided to a user.

In such embodiments, the gaming device may be selected or determined to match or correspond to the unique identifier of the particular bracelet. For example, a unique identifier may be stored by, coded into, or programmed into the wireless gaming device.

In other embodiments of the invention, a unique identifier, and/or user characteristics, are coded into the bracelet at the time the wireless gaming device is registered to be provided to a user. In these embodiments, the identifier of the bracelet would be set to match, correspond to or otherwise be recognized by, the wireless gaming device.

In some embodiments of the invention, the identifiers associated with a hard check apparatus (e.g., a bracelet as discussed above) are stored on a server or other device that the wireless gaming device can access. In other embodiments, the wireless gaming device does not store such identifiers. Information conveyed from the apparatus to the wireless gaming device may be checked, compared to predetermined criteria or matched locally (i.e., at the wireless gaming device by, e.g., the device itself) or remotely through, e.g., a server which can authenticate users and communicate back with the device. For example, such information may be transmitted across network 16 of FIG. 1 and may be processed by computer 18.

In some embodiments of the invention, the identifier associated with a particular apparatus (e.g., bracelet) allows one or more accounts of the user to be recognized and accessed. For example, an account that stores or manages the "comp points" of the user may be determinable by, and accessible from, the wireless gaming device. Thus, the user may wager using the wireless gaming device and also have her comp points manipulated (e.g., added to in accordance with her use of the wireless gaming device).

The wireless gaming device can be programmed to determine the form of hard check used (e.g., from a bracelet instead of from a comp card with a magnetic stripe). For example, the manner of input may provide such a determination (e.g., an identifier received via an integrated card reader as depicted in FIG. 10 indicates that the hard check is performed via a card, while an identifier received via an RFID transponder indicates that the hard check is performed via a bracelet as depicted in FIG. 11). Alternatively or additionally, the form of hard check may be coded into the identifier. For example, identifiers that begin with the number "1" may indicate that the hard check is via a card, while identifiers that begin with the number "2" indicate that the hard check is via a bracelet.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   a gaming device determining a characteristic of a user that is authorized to use the gaming device,
      in which the characteristic comprises an indication that the user is one of:
         a high-volume wagerer,
         a medium-volume wagerer, and
         a low-volume wagerer,
      in which the gaming device is operable in combination with at least one server computer to provide at least one wagered-based gaming activity to the user, and
      in which the gaming device is in communication with the at least one server computer over a wireless communications network;
   the gaming device determining that wagering occurring via the gaming device, by an operator of the gaming device, on the at least one wagered-based gaming activity deviates from the characteristic of the user; and
   the gaming device denying access to the operator of the gaming device based at least in part on determining that the wagering occurring via the gaming device deviates from the characteristic of the user.

2. The method of claim 1, in which the at least one wagered-based gaming activity comprises at least one of:
   a gambling activity,
   an activity that comprises wagering on an event, and
   a lottery-based activity.

3. The method of claim 1, in which the gaming device comprises a wireless mobile gaming device registered to at least the use.

4. The method of claim 1,
   in which determining the characteristic comprises at least one of obtaining and receiving the characteristic from a second device;
   in which the second device is physically separate from the gaming device; and
   in which the second device comprises at least one of:
      a device adapted to be worn, and
      a device adapted to be carried.

5. The method of claim 4, in which the second device comprises a bracelet.

6. The method of claim 4, in which the second device comprises at least one of:
an RFID transponder programmed with the characteristic,
a magnetic strip comprising the characteristic,
an optically readable identifier comprising the characteristic,
a storage medium comprising the characteristic,
a disc comprising the characteristic,
a memory comprising the characteristic, and
a tape comprising the characteristic.

7. The method of claim 1, further comprising:
the gaming device at least one of obtaining and receiving identifying information from a second device,
in which the second device is physically separate from the gaming device, and
in which the second device comprises at least one of:
a device adapted to be worn, and
a device adapted to be carried; and
in which access is provided to the gaming device based at least in part on a determination that the identifying information is associated with the user that is authorized to use the gaming device.

8. The method of claim 7, in which determining the characteristic comprises at least one of obtaining and receiving the characteristic from the second device.

9. The method of claim 8, in which the second device comprises a bracelet.

10. The method of claim 7, further comprising:
based at least in part on the determination that the identifying information is associated with the user that is authorized to use the gaming device, the gaming device providing a signal, in which the signal comprises at least one of:
a visual signal,
an audio signal, and
the gaming device vibrating.

11. The method of claim 1, further comprising:
the gaming device at least one of obtaining and receiving a first identifier from a second device,
in which the second device is physically separate from the gaming device, and
in which the second device comprises at least one of:
a device adapted to be worn, and
a device adapted to be carried; and
in which access is provided to the gaming device based at least in part on a determination that the first identifier matches the second identifier.

12. The method of claim 11, in which determining the characteristic comprises at least one of obtaining and receiving the characteristic from the second device.

13. The method of claim 12, in which the second device comprises a bracelet.

14. The method of claim 11, further comprising:
based at least in part on the determination that the first identifier matches the second identifier, the gaming device providing a signal, in which the signal comprises at least one of:
a visual signal,
an audio signal, and
the gaming device vibrating.

15. The method of claim 1, further comprising:
the gaming device detecting a signal produced by a second device,
in which the second device is physically separate from the gaming device, and
in which the second device comprises at least one of:
a device adapted to be worn, and
a device adapted to be carried; and
in which access is provided to the gaming device based at least in part on the gaming device detecting the signal.

16. The method of claim 1, further comprising:
the gaming device causing an alarm signal to be generated based at least in part on determining that the wagering occurring via the gaming device on the at least one wagered-based gaming activity deviates from the characteristic of the user.

17. A method comprising:
a gaming device determining a characteristic of a user that is authorized to use the gaming device,
in which the characteristic comprises an indication that the user is one of:
a high-volume wagerer,
a medium-volume wagerer, and
a low-volume wagerer,
in which the gaming device is operable in combination with at least one server computer to provide at least one wagered-based gaming activity to the user, and
in which the gaming device is in communication with the at least one server computer over a wireless communications network;
the gaming device determining that wagering occurring via the gaming device, by an operator of the gaming device, on the at least one wagered-based gaming activity deviates from the characteristic of the user; and
the gaming device causing an alarm signal to be generated based at least in part on determining that the wagering occurring via the gaming device on the at least one wagered-based gaming activity deviates from the characteristic of the user.

18. The method of claim 17, in which the at least one wagered-based gaming activity comprises at least one of:
a gambling activity,
an activity that comprises wagering on an event, and
a lottery-based activity.

19. The method of claim 17, in which the gaming device comprises a wireless mobile gaming device registered to at least the use.

20. The method of claim 17,
in which determining the characteristic comprises at least one of obtaining and receiving the characteristic from a second device;
in which the second device is physically separate from the gaming device; and
in which the second device comprises at least one of:
a device adapted to be worn, and
a device adapted to be carried.

21. The method of claim 20, in which the second device comprises a bracelet.

22. The method of claim 20, in which the second device comprises at least one of:
an RFID transponder programmed with the characteristic,
a magnetic strip comprising the characteristic,
an optically readable identifier comprising the characteristic,
a storage medium comprising the characteristic,
a disc comprising the characteristic,
a memory comprising the characteristic, and
a tape comprising the characteristic.

23. The method of claim 17, further comprising:
the gaming device at least one of obtaining and receiving identifying information from a second device,
in which the second device is physically separate from the gaming device, and
in which the second device comprises at least one of:

a device adapted to be worn, and
a device adapted to be carried; and
in which access is provided to the gaming device based at least in part on a determination that the identifying information is associated with the user that is authorized to use the gaming device.

24. The method of claim 23, in which determining the characteristic comprises at least one of obtaining and receiving the characteristic from the second device.

25. The method of claim 24, in which the second device comprises a bracelet.

26. The method of claim 23, further comprising:
based at least in part on the determination that the identifying information is associated with the user that is authorized to use the gaming device, the gaming device providing a signal, in which the signal comprises at least one of:
a visual signal,
an audio signal, and
the gaming device vibrating.

27. The method of claim 17, further comprising:
the gaming device at least one of obtaining and receiving a first identifier from a second device,
in which the second device is physically separate from the gaming device, and
in which the second device comprises at least one of:
a device adapted to be worn, and
a device adapted to be carried; and
in which access is provided to the gaming device based at least in part on a determination that the first identifier matches the second identifier.

28. The method of claim 27, in which determining the characteristic comprises at least one of obtaining and receiving the characteristic from the second device.

29. The method of claim 28, in which the second device comprises a bracelet.

30. The method of claim 27, further comprising:
based at least in part on the determination that the first identifier matches the second identifier, the gaming device providing a signal, in which the signal comprises at least one of:
a visual signal,
an audio signal, and
the gaming device vibrating.

31. The method of claim 17, further comprising:
the gaming device detecting a signal produced by a second device,
in which the second device is physically separate from the gaming device, and
in which the second device comprises at least one of:
a device adapted to be worn, and
a device adapted to be carried; and
in which access is provided to the gaming device based at least in part on the gaming device detecting the signal.

* * * * *